(12) United States Patent
Gundersen et al.

(10) Patent No.: US 7,835,934 B2
(45) Date of Patent: Nov. 16, 2010

(54) SYSTEM AND METHOD OF WORK MANAGEMENT

(75) Inventors: Charles J. Gundersen, Savage, MN (US); Tracey A. Gundersen, Savage, MN (US)

(73) Assignee: Warranty Management Technologies LLC, Burnsville, MN (US)

( * ) Notice: Subject to any disclaimer, the term of this patent is extended or adjusted under 35 U.S.C. 154(b) by 1599 days.

(21) Appl. No.: 10/839,662

(22) Filed: May 5, 2004

(65) Prior Publication Data

US 2004/0236619 A1   Nov. 25, 2004

Related U.S. Application Data

(60) Provisional application No. 60/472,333, filed on May 21, 2003.

(51) Int. Cl.
*G06Q 10/00* (2006.01)

(52) U.S. Cl. .......................................................... 705/8

(58) Field of Classification Search ...................... 705/8
See application file for complete search history.

(56) References Cited

U.S. PATENT DOCUMENTS

| | | | |
|---|---|---|---|
| 5,754,857 A | 5/1998 | Gadol | |
| 5,890,134 A | 3/1999 | Fox | |
| 5,902,352 A | 5/1999 | Chou et al. | |
| 5,963,913 A | 10/1999 | Henneuse et al. | |
| 6,098,091 A | 8/2000 | Kisor | |
| 6,115,642 A * | 9/2000 | Brown et al. ................ | 700/104 |
| 6,347,330 B1 | 2/2002 | Dawson et al. | |
| 6,353,853 B1 | 3/2002 | Gravlin | |
| 6,370,573 B1 | 4/2002 | Bowman-Amuah | |
| 6,430,562 B1 | 8/2002 | Kardos et al. | |
| 6,442,563 B1 | 8/2002 | Bacon et al. | |
| 6,484,033 B2 | 11/2002 | Murray | |
| 6,487,457 B1 | 11/2002 | Hull et al. | |
| 6,567,807 B1 | 5/2003 | Robles et al. | |
| 6,571,246 B1 | 5/2003 | Anderson et al. | |
| 6,580,982 B2 | 6/2003 | Sinex | |
| 6,621,505 B1 | 9/2003 | Beauchamp et al. | |
| 6,678,714 B1 | 1/2004 | Olapurath et al. | |
| 6,792,474 B1 | 9/2004 | Hopprich et al. | |
| 6,993,576 B1 | 1/2006 | Labedz et al. | |
| 7,117,162 B1 * | 10/2006 | Seal et al. ..................... | 705/9 |
| 7,155,439 B2 * | 12/2006 | Cope ............................... | 1/1 |

(Continued)

OTHER PUBLICATIONS

McCune, Heather; "Professional Builder", Oct. 2000, vol. 65, Iss 12, p. 68, 6 pgs.*

(Continued)

*Primary Examiner*—Jonathan G Sterrett
(74) *Attorney, Agent, or Firm*—Dicke, Billig & Czaja, PLLC

(57) ABSTRACT

A method of managing construction work including creating a work request regarding a building in a database coupled to an owner user interface and a builder user interface, assigning the work request created in the database to a trade contractor to complete the work request, and tracking the status of the work request in the database. The method further includes storing the work request, the trade contractor, and the status in the database for subsequent access via at least one of the owner user interface and the builder user interface.

37 Claims, 24 Drawing Sheets

U.S. PATENT DOCUMENTS

| | | | |
|---|---|---|---|
| 2001/0051884 A1 | 12/2001 | Wallis et al. | |
| 2002/0040325 A1 | 4/2002 | Takae et al. | |
| 2002/0113877 A1* | 8/2002 | Welch | 348/148 |
| 2002/0147732 A1 | 10/2002 | Lee et al. | |
| 2002/0153134 A1* | 10/2002 | Newman | 166/53 |
| 2003/0061076 A1 | 3/2003 | Okuyama et al. | |
| 2003/0084067 A1* | 5/2003 | Obiaya | 707/104.1 |
| 2003/0126001 A1 | 7/2003 | Northcutt et al. | |
| 2003/0187865 A1* | 10/2003 | Frisina | 707/102 |
| 2003/0197733 A1 | 10/2003 | Beauchamp et al. | |
| 2007/0230682 A1* | 10/2007 | Meghan et al. | 379/265.06 |

OTHER PUBLICATIONS

Hussain, Azmo; Murthy DNP; "Warranty and Redundancy Design with Uncertain Quality", 1998, IIE Transactions, 30, pp. 1191-1199.*

Down, Susan; "Owners put pressure on building inspectors", Jul. 31, 1999, Times-Colonist, Evening Edition, p. F3.*

Ong, Seow-Eng, "Caveat Emptor: adverse selection in buying properties under construction", 1999, Property Management, vol. 17, Issue 1. pp. 49-64.*

Barrett, Tom; "Condo owners' nightmare drags on: Condo board, owners headed to arbitration", Feb. 4, 2001, Edmonton Journal, p. B.1.FRO.*

Lurz, Bill; "Finally . . . technology tools to grow your company", Professional Builder, Jul. 2001, vol. 66, Iss. 7, pp. 38. 11 pgs.*

Louisiana New Home Warranty Act of 1986. 5 pgs.*

Prohome.com's home maintenance and repair service: http://web.archive.org/web/20020206083907/www.prohome.com/build_warrnty.htm.*

Prohome.com's builder's warranty service http://web.archive.org/web/20020206083907/www.prohome.com/build_warrnty.htm.*

DexterChaney's software for builders: http://web.archive.org/web/20020204052321/www.dexterchaney.com/prod_htm/default.htm.*

BuilderMT's software for the construction industry http://web.archive.org/web/20020603170940/www.buildermt.com/enhancements.html.*

* cited by examiner

SYSTEM AND METHOD OF WORK MANAGEMENT

CROSS-REFERENCE TO RELATED APPLICATIONS

This patent application claims priority to U.S. Provisional Patent Application Ser. No. 60/472,333, filed May 21, 2003, and incorporated herein by reference.

THE FIELD OF THE INVENTION

The present invention generally relates to a system and method of warranty management, and more particularly, to a system and a method of communicating product status and warranty information between at least two parties.

BACKGROUND OF THE INVENTION

Increasingly, products purchased and services rendered are subject to warranty agreements between a purchaser and a vendor or a service provider. In some cases the warranty agreements are between a purchaser, a service provider, and a vendor or trade contractor. Management of the increasing number of warranties for a single party can be difficult as it requires excessive paperwork and organization. These problems are magnified when multiple parties, i.e. the purchaser, service provider, and vendor, attempt to coordinate their records and schedules to service a product under warranty.

One particularly difficult area of warranty management is in the field of newly built homes. Homeowners contract with home builders to build a new home. The home builders in turn contract with multiple trade contractors, such as electricians, plumbers, carpenters, etc., to complete the specialized tasks of home building. Upon completion of a new home, builder warranties exist on a plurality of building services and products that have been installed in the home. When a home requires warranty work, the homeowner, the builder, and the respective trade contractors all must communicate and work together to complete the warranty work. Such codependency exacerbates the problems generally associated with warranty work described above. These problems are further emphasized due to the mobile nature of builders and especially trade contractors, which often produces additional communication and organizational obstacles.

To further confuse the issue, the exact standards of a builder's limited warranty are often poorly defined, or routinely exceeded by the builder. Builders tend to refer to warranty work as "service" work, because each builder will provide the level of service appropriate to their corporate culture and clientele, regardless of inclusion in their warranty standards. Service work and warranty work are handled as one-and-the-same, with a work order being sent to the appropriate contractor. This lack of differentiation between "warranty" and "service" can lead to separate issues, such as whether a contractor performed deficient work and should fix it at their own expense, or a builder is asking for an unnecessary service "extra" and should be required to pay the contractor for this additional work.

More particularly, whether a warranty issue is discovered through a regularly scheduled home walk-through or independently reported by a homeowner, conventional warranty issues center around a paper work order. For each item requiring attention, a paper work order is generated detailing the warranty action necessary, if any, and designating a trade contractor to complete the necessary action. Typically, the builder or other warranty administering party forwards the work order to the designated trade contractor via phone, fax, or mail. Upon notification of the work order the designated trade contractor performs the necessary action to remedy the reported warranty issue and then reports the remedied warranty issue to the builder or other warranty administering party. At which point, the builder or other warranty administering party verifies the remedy of the warranty issue with the homeowner and archives the work order.

This paper communication trail is administratively intense and troublesome when increased in scale to a builder who builds thousands of homes a year and/or applied to a trade contractor who likely services multiple builders. Furthermore, typical trade contractors are extremely mobile in nature as trade contractors are often in and out of their service vehicles for a significant portion of working hours. The mobile nature of typical trade contractors can make paperwork nearly impossible to organize. Often times multiple printed work orders and notes from phone conversations are piled in the service vehicle of the trade contractor with little or no organization. Even if the work orders are handled in an orderly and efficient manner in the Builder's office, there is no consistent treatment of work orders through the hierarchy of builder, to trade contractor, to actual service person, to homeowner. Due in part to this lack of organization and the difficulty in locating and communicating with trade contractors, work orders often remain outstanding for an undesirable length of time frustrating builders and homeowners alike.

This problem is further aggravated by the fact that relatively few builders have a standardized system for reporting work orders and scheduling such work orders to a particular trade contractor. While most builders recognize and even emphasize the importance of placing a high priority on resolving warranty issues, completion of this work can be made difficult due to management and scheduling difficulties surrounding repair of such issues. Consequently, the response time to work order requests can be further extended, thereby, increasing homeowner frustration. Frustrated homeowners often phone the builder to determine the status of work order repairs. Builders often do not have the most up-to-date work order status and must, in turn, call the trade contractor to determine the current work order status and then call the homeowner to relay the information. Not only do the original homeowner phone calls fail to remedy homeowner frustrations, but the calls further inundate the builder with administrative duties, thereby, further increasing the time needed to complete a work order.

In view of the above, a need exists for a system and method of streamlining the warranty work repair process and increasing the ease of communication between the parties involved.

SUMMARY OF THE INVENTION

One aspect of the present invention relates to a method of managing construction warranty work including creating a work request regarding a building in a database coupled to an owner user interface and a builder user interface, assigning the work request created in the database to a trade contractor to complete the work request, and tracking the status of the work request in the database. The method further includes storing the work request, the trade contractor, and the status in the database for subsequent access via at least one of the owner user interface and the builder user interface.

Another aspect of the present invention relates to a method of managing construction warranty work including creating a work request regarding a building in a database coupled to an owner interface and a builder interface, assigning the work request created in the database to a trade contractor to complete the work request, tracking the status of the work request in the database, and reporting the work request as complete to the database. The method further includes storing the work request, the trade contractor, the status, and the report of completion in the database for subsequent access via at least one of the owner interface and the builder interface.

Another aspect of the present invention relates to a construction warranty management system including a database and a network communication link. The database stores work order information relating to a building. The work order information includes a work request, a trade contractor assigned to the work request, and the status of the work request. The network communication link is coupled with the database. The database is configured to selectively interface with at least one of an owner and a builder via the network communication link.

Another aspect of the present invention relates to a computer readable medium having computer-executable instructions for performing a method of managing construction warranty information including creating a work request regarding a building in a database coupled to an owner and a builder, assigning the work request created in the database a trade contractor to complete the work request, and tracking the status of the work request in the database.

Yet another aspect of the present invention relates to a method of managing construction warranty work, the method including creating a work request regarding a building in a database coupled to an owner user interface, a builder user interface, a trade contractor user interface, and an administrator user interface; determining if the work request falls within a builder's limited warranty; and assigning the work request created in the database to a trade contractor to complete the work request, including scheduling a time for the trade contractor to complete the work request. The method further includes tracking the status of the work request in the database; reporting the work request as complete to the database, storing the work request, the trade contractor, the scheduled time, the status, and the report of completion in the database for subsequent access via at least one of the owner user interface, the builder user interface, the trade contractor user interface, and the administrator user interface; logging records of communications between at least two of the owner user interface, the builder user interface, the trade contractor user interface, and the administrator user interface in the database; and generating empirical data based at least in part upon the tracked status of the work request.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

FIG. 16 is a flow chart illustrating an exemplary embodiment of a administrative method of completing homeowner related tasks in accordance with the flow chart of FIG. 15.

FIG. 19 is a diagram illustrating an exemplary embodiment of an administrator menu display screen for completing work order related tasks per the method of FIG. 18.

DESCRIPTION OF EXEMPLARY EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
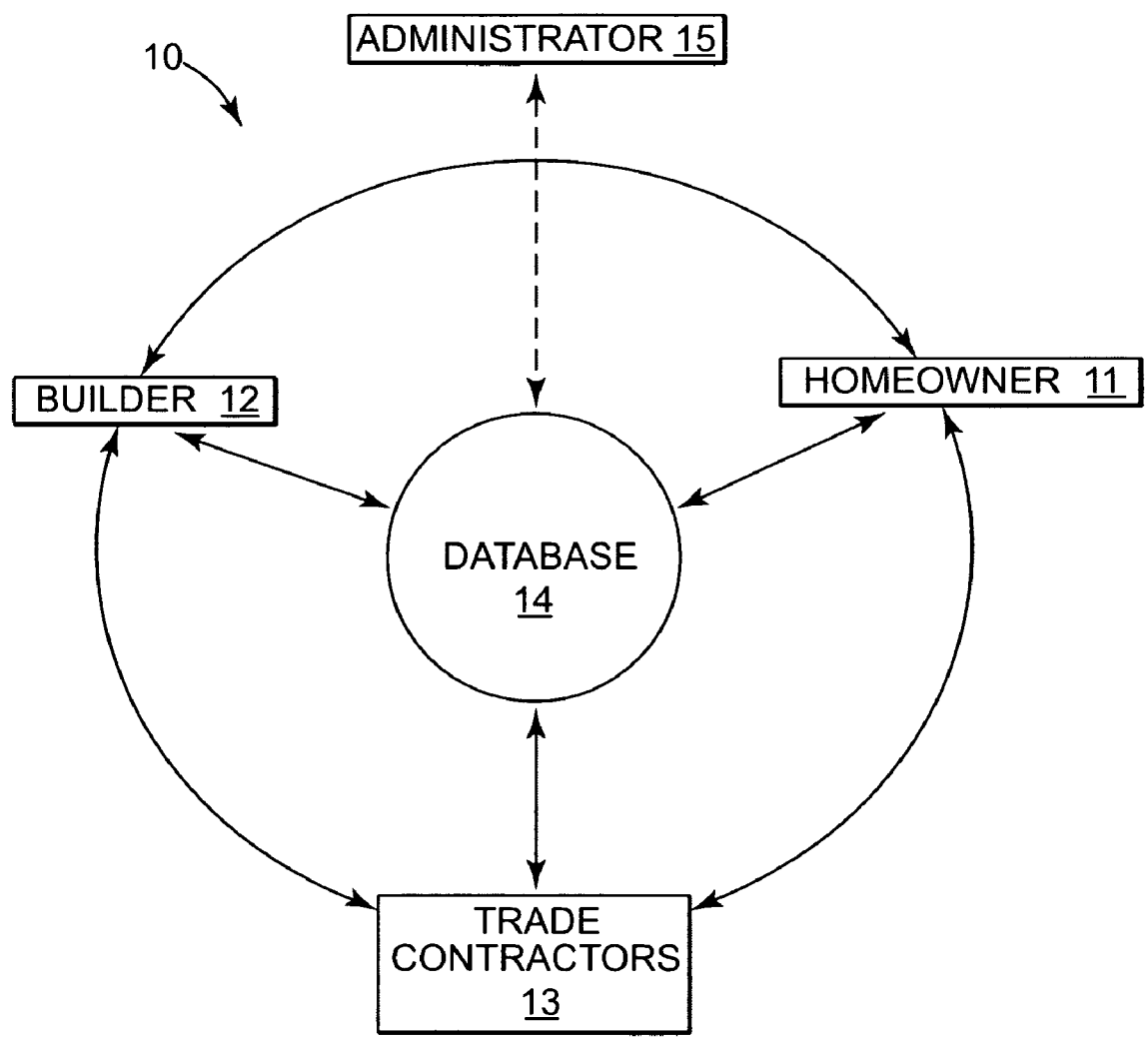
FIG. 1 is a block diagram generally illustrating an exemplary embodiment of a construction work management system.

One exemplary embodiment of a work management system, and in one embodiment of a construction work management system, is generally illustrated in FIG. 1 at 10. Construction work management system 10 provides a central line of communication between multiple parties, more specifically, between a homeowner 11, a builder 12, and at least one trade contractor 13. Construction work management system 10 stores warranty information and provides a conduit for information to travel between parties 11, 12, and 13. By maintaining a communication log and storing other related information for subsequent access, each participant or party 11, 12, and 13 in the home building process can be adequately informed of the up-to-date status of any new, ongoing, or completed warranty or non-warranty work. With this in mind, construction work management system 10 decreases or alleviates problems associated with organization, recordation, and communication with respect to home warranty and non-warranty work and management.

In particular, construction work management system 10 includes a central database or server 14 to store warranty information and to record accounts of the communications between the parties 11, 12, and 13. Central database 14 supplements the traditional, direct party-to-party means of communication. The central database allows the homeowners 11, builder 12, and trade contractor 13 to communicate with one another and access records regarding the status of construction work without direct party interaction.

In one embodiment, construction work management system 10 further includes an administrator 15. Administrator 15 maintains the functioning of database 14. In addition, in one embodiment, administrator 15 accesses and analyzes warranty work information to develop reports and statistics regarding the warranty work of a particular trade contractor 13, of a particular builder 12, or done for a particular homeowner 11, etc. and makes such reports available to the participating parties 11, 12, and 13 through central database 14. In one embodiment, administrator 15 is a separate party from builder 12. In one embodiment, administrator 15 and builder 12 are subsidiaries of a larger builder or contractor (not shown). In one embodiment, the larger builder or contractor builds new homes in a plurality of developments or geographical areas and builder 12 is the builder in one of the plurality of developments or geographical areas.

Notably, although described herein as construction work management system 10, in one embodiment the warranty management system is used to manage construction related warranties following construction of a commercial or other building or structure rather than a residential dwelling or home. In this embodiment, the warranty management system is a building warranty management system that is similar to construction work management system 10 described herein except for homeowner 11 is a building owner and other incidental changes as will be apparent to one of skill in the art.

System and User Hierarchy

One embodiment of the work management system 10 and method operates at several different levels of functionality, which make it useful to different parties 11, 12, 13, etc. to the building/construction and warranty processes at levels that are relevant to the particular role of each relevant party. In one embodiment, all information that is entered into work management system 10 remains stored in active memory or database 14 for an extended length of time, such as 12 years and 6 months, in order to make it available for any warranty claims that may arise and be reported in conjunction with local laws and regulations.

Homeowner and work order data can be removed from active viewing by deleting items or by homeowners 11 expiring from their statutory warranty coverage, but such items are only marked for deletion from the viewable portion of the work management system 10 application. These expired homeowners or deleted work orders can be retrieved and viewed or edited if necessary. After the extended length of time, such as ten years and six months, the deleted work orders are permanently stored or archived, but are no longer actively available to most parties to work management system 10.

Work management system 10 at least partially resides in one or more linked servers, and functions as one system, but is comprised of multiple divisions, each division having it's own access via an internet address. The basic unit of organization is a "site", which is an administrative unit in which one or more administrators act as system managers. A site may be managed by a single builder, a group of builders, a third-party warranty management service, or any other entity that may have an interest in managing warranty and service work for a number of homes or buildings.

Users who access the site through the distinct and separate administrative internet address are administrators 15, or individual users within an administrator group 15. In one embodiment, administrators 15 have a largely "input" role, with capabilities of data entry, editing user identification, and general management capabilities of the system, system access, and data. Each site is also accessible by "web users" at a distinct and separate internet address(es), which can be accessed directly from the site or linked to another site with pre-written code that is available through the administrator's access. The web user access can be customized to incorporate the logo and color scheme of the builder 12, in effect rendering the underlying system invisible to the web user such that the site would appear as if the site is part of the builder's own system.

Web users, for example, homeowners 11, builders 12, trade contractors 13, etc., do not necessarily have any previous involvement with work management system, and are included by virtue of their involvement with a home that is enrolled in the work management system. Web users primarily have access to "output" data which has been collected and processed by administrator 15. Web users have some limited input ability, such as builders assigning trade contractors to work orders, all web users can edit their own passwords and user name, and a few other functions. However, in one embodiment, web users have access to a restricted set of data, and have no ability to change their own role in the system. In other embodiments, web users have access to a less restricted, if at all restricted, set of data and have ability to change their own role in the system.

There is another part of the system that includes remote access from mobile devices, such as laptop computers, tablet personal computers, handheld PDAs, etc., with wireless capability to send and receive data. In one embodiment, the users accessing the mobile devices are part of the administrator 15 of work management system 10, and can send data directly into data storage of work management system 10 through a synchronization process with the data storage.

In one embodiment, work management system 10 further includes at least one administration user called a "superadministrator" (not shown), which may exist at one or more levels above the web users and administrative users. The superadministrator can create, access, and accumulate reports based on the cumulative data stored in the application derived from comparing, contrasting, accumulating, dividing, segmenting, or otherwise manipulating the anonymous data stored in the application. The superadministrator can be designated to have access to derive information from one, several, or all of the sites included as part of work management system 10. In one embodiment, superadministrator status is assignable only by the owners of the system. In one embodiment, superadministrator status cannot be added, modified, or otherwise controlled by any administrator or any other superadministrator.

Notably, work management system 10 is specifically designed to accommodate any number of associated website links, inserts, or other devices which would facilitate the inclusion of business relationships that would increase the customer service value of the application. Inclusion of training systems, newsletters, links to other warranty or service related products or companies, or other allied entities are not listed nor described, but are specifically allowed for within this invention.

Construction Work Management System

Figure 2:
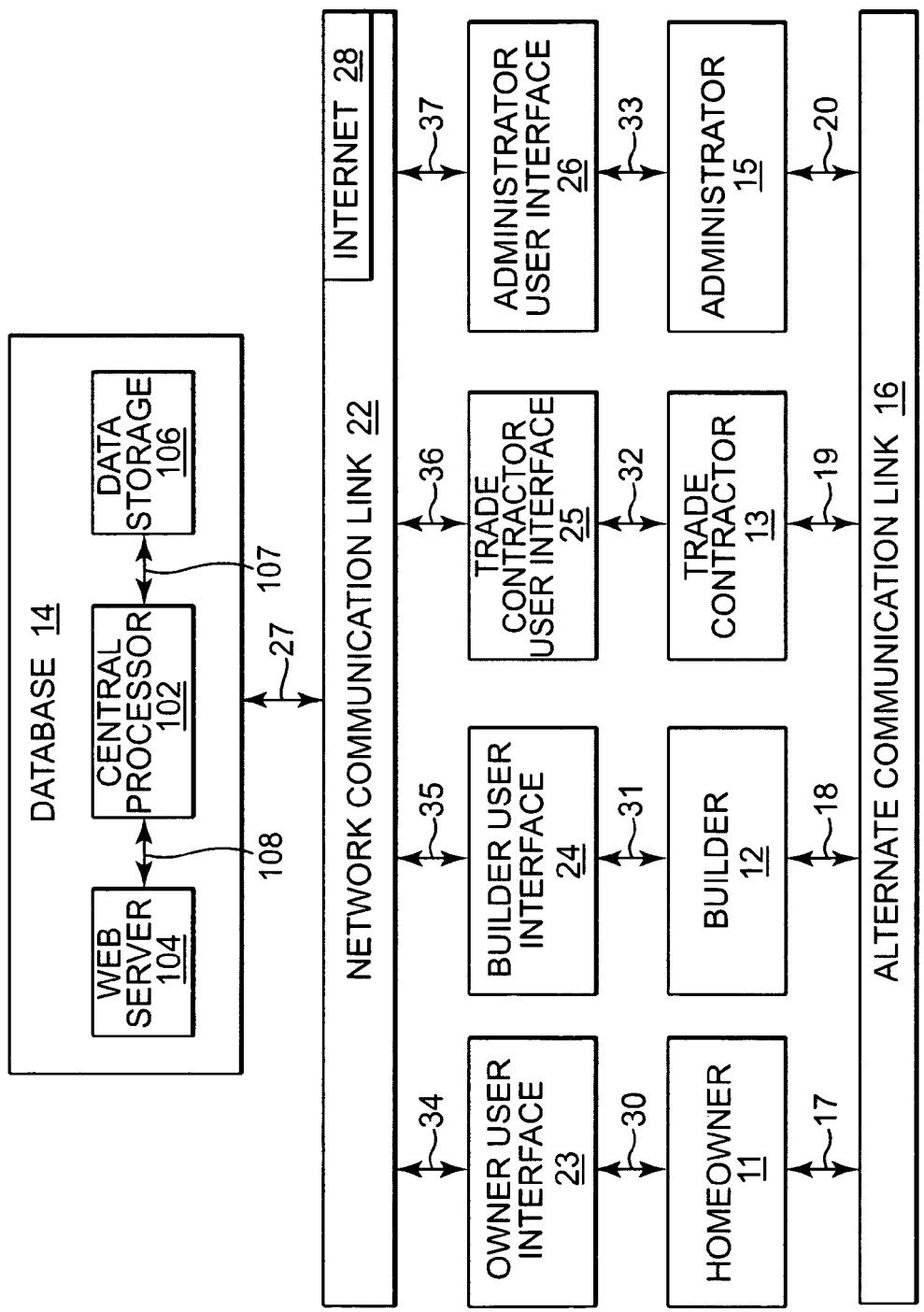
FIG. 2 is a block diagram illustrating an exemplary embodiment of the construction work management system.

One exemplary embodiment of the organization of construction work management system 10 is more specifically illustrated in FIG. 2. Homeowner 11, builder 12, trade contractor 13, and administrator 15 are each connected via an alternative communication link 16. In one embodiment, alternative communication link 16 is a phone or a fax line, a mail or courier service, or other conventional communication link as will be apparent to those of ordinary skill in the art. In particular, homeowner 11, builder 12, trade contractor 13, and administrator 15 are each coupled with the alternative communication link 16 via communication links 17, 18, 19, and 20, respectively. As such, homeowner 11, builder 12, trade contractor 13, and administrator 15 can individually communicate with one another via alternative communication link 16. Notably, alternative communication link 16 does not facilitate recordation or tracking of communications between the parties 11, 12, 13, and 15.

Construction work management system 10 additionally includes a network communication link 22, an owner interface 23, a builder interface 24, a trade contractor interface 25, and an administrator interface 26. Network communication link 22 is connected to database 14 via communication link 27. Connection of the parties 11, 12, 13, and 15 via alternative communication link 16 is supplemented by additionally connecting each of the parties 11, 12, 13, and 15 to central database 14 via network communication link 22. Network communication link 28, as used herein, is defined to include an internet communication link such as an Internet communication link, an intranet communication link, or similar high-speed communication link. In one preferred embodiment, network communication link 22 includes an Internet communication link 28. While the following description only refers to Internet communication link 28, it is understood that the use of other network communication links is within the scope of the present invention. In addition, network communication link 22 may include a wireless communication link as will be further described below.

More specifically, homeowner 11, builder 12, trade contractor 13, and administrator 15 access network communication link 22 and, thereby, database 14 via user interfaces 23, 24, 25, and 26, respectively. Homeowner 11, builder 12, trade contractor 13, and administrator 15 are each connected to the respective user interface 23, 24, 25, and 26 via communication links 30, 31, 32 and 33, respectively. Similarly, each of the user interfaces 23, 24, 25, and 26 are connected to network 22 via communication links 34, 35, 36, and 37, respectively. By way of the user interfaces 23, 24, 25, and 26, each of the parties 11, 12, 13, and 15 can communicate with each other via the network 22. In one embodiment, each user interface 23, 24, 25, and 26 is a Graphical User Interface (GUI) and is presented to the respective party 11, 12, 13, and 15 on computing device, such as a desktop computer, a mobile computer, a cell phone, a personal digital assistant (PDA), etc.

Database 14 processes, stores, and presents files regarding communication between parties 11, 12, 13, and 15, warranty information, and work order status information, etc. The information in database 14 can, thereby, be accessed by homeowner 11, builder 12, trade contractor 13, or administrator 15 via the user interfaces 23, 24, 25, and 26 and network communication link 22.

Notably, components of the present invention can be implemented in hardware via a microprocessor, programmable logic, or state machine, in firmware or in software with a given device. In one aspect, at least a portion of the software programming is web-based and written in Hyper Text Markup Language (HTML) and/or Java programming languages, including links to user interfaces for data collection, such as a Windows based operating system. Each of the main components may communicate via a network using a communication bus protocol. For example, the present invention may use a Transmission Control Protocol/Internet Protocol (TCP/IP) suite for data transport. Other programming languages and communication bus protocols suitable for use with the present invention will become apparent to those skilled in the art after reading this disclosure. Components of the present invention may also reside in software on one or more computer-readable mediums. The term "computer-readable medium" as used herein is defined to include any kind of memory, whether volatile or non-volatile such as floppy disk, hard disk, CD-ROMs, flash memory, read-only memory (ROM) and random access memory (RAM). In one embodiment, components of the present invention operate on a Microsoft®.NET framework.

Figure 3:
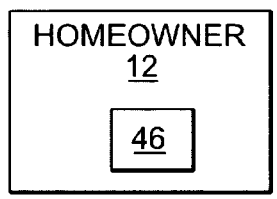
FIG. 3 is a block diagram illustrating an exemplary embodiment of a homeowner included in the construction work management system of FIG. 2.

As included in the described embodiments, homeowner 12 is a party which recently purchased a new home or residential dwelling (not shown). Preferably, homeowner 12 purchased the new home within the past 24 months, more preferably, within the past 12 months. In particular, homeowner 12 purchased a newly constructed home from builder 12. As generally illustrated with additional reference to FIG. 3, homeowner 11 has at least one computer processing unit (CPU) 46 to facilitate connection with central database 14 via network 22 and to support owner user interface 23. Although illustrated in FIGS. 1 and 2 as a single homeowner 11 for illustrative purposes, in one embodiment, construction work management system 10 includes a plurality of homeowners 11.

Figure 4:
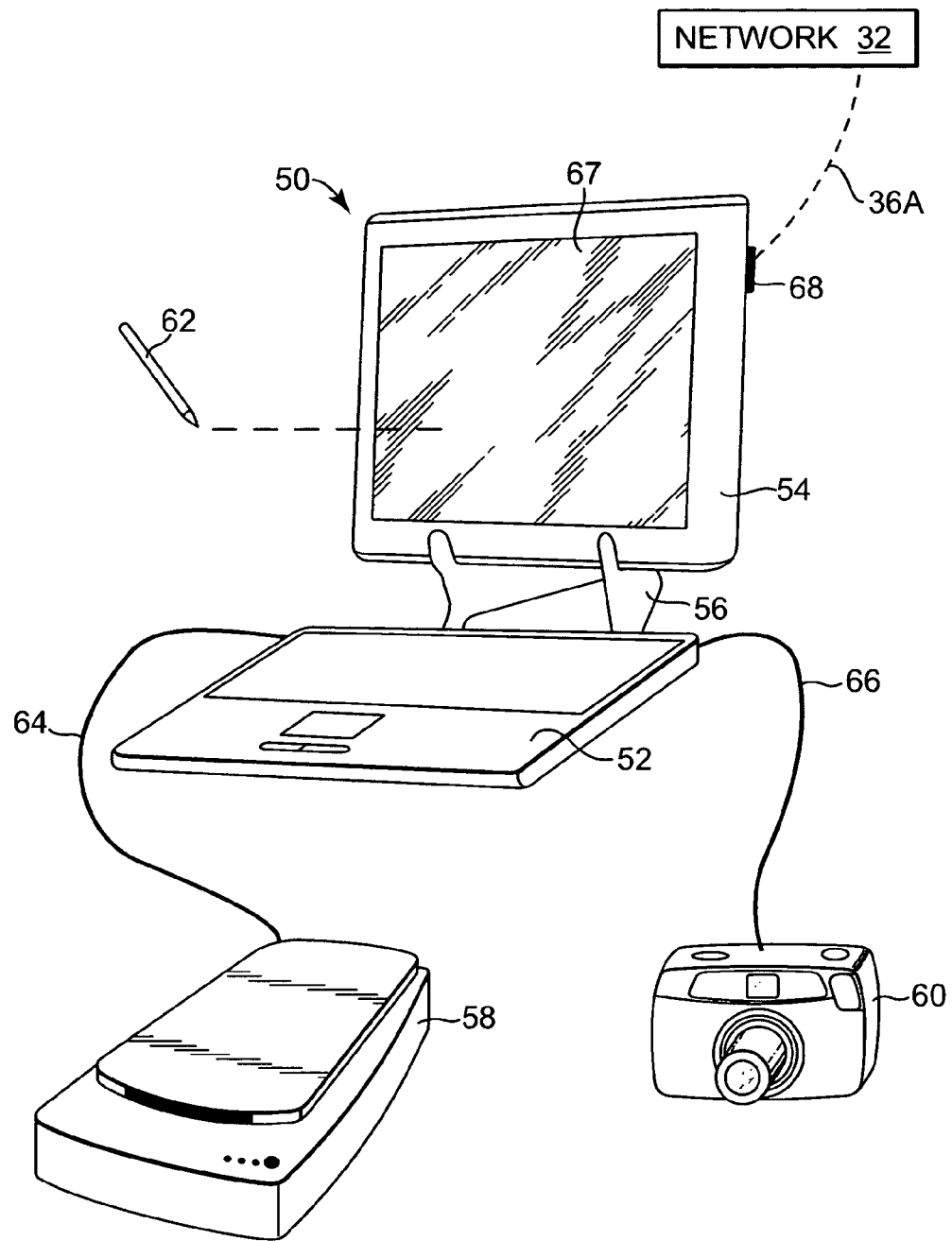
FIG. 4 is a schematic diagram of an exemplary embodiment of a computer processing unit included in the construction work management system of FIG. 2.

In one embodiment, generally illustrated in FIG. 4, CPU 46 is any commercially available processor-based system capable of facilitating party connection with network 22. In one embodiment, CPU 46 is a mobile computer, more particularly, a tablet personal computer (PC) 50, which is designed for portability and allows for hand-written input. The tablet PC permits mobile information gathering and can be synchronized with the central server.

In one embodiment, tablet PC 50 includes a keyboard 52 and a monitor 54. Keyboard 52 allows input into CPU 46 and communicates with monitor 54. In one embodiment, keyboard 52 is electrically and selectively coupled with monitor 54 via a cradle 56. Monitor 54 visually displays the computer operation and program to a user, or more specifically, homeowner 11. In one embodiment, monitor 54 of tablet PC 50 is removable from cradle 56 for use separate from cradle 56 and keyboard 52. Upon re-docking of monitor 54 with cradle 56, information entered into monitor 54 while docketed to cradle 56 is uploaded to the processor (not shown) of the tablet PC 50 in a process known as synchronization. In other embodiments, tablet PC 50 does not include cradle 56 and monitor 54 is directly coupled to keyboard 52 in a manner allowing input to be received via monitor 54. In one embodiment, tablet PC 50 includes additional input devices other than keyboard 52, such as a scanner 58, a digital camera 60, and/or a digitizer pen 62.

Scanner 58 is any scanner commercially available and is electrically connected to tablet PC 50 via an electrical link 64. Digital camera 60 is any digital camera commercially available and is selectively connected to tablet PC 50 via electrical link 66. Notably, tablet PC 50 includes software designed to configure and display input from scanner 58 or digital camera 60. Digitizer pen 62 interfaces with a screen 67 of monitor 54 to input data to tablet PC 50. Notably, tablet PC 50 includes specific programming designed to facilitate interaction between digitizer pen 62 and screen 67. In one embodiment, tablet PC 50 includes handwriting recognition software capable of translating written notes to conventional text. Preferably, tablet PC 50 including digitizer pen 62 is still configured to receive conventional input from keyboard 52. Tablet PC 50 further includes a modem 68 to provide connection to communication link 36 (illustrated in FIG. 2) connected to network 22. In particular, modem 68 provides partial communication link 36A, which is a wireless or land based communication link. In one embodiment, modem 68 is a Bluetooth modem, an Ethernet modem, or other commercially available wireless modem. In an alternative embodiment, CPU 46 is a Personal Digital Assistant (PDA) or other handheld device capable of interfacing with network 22.

Figure 5:
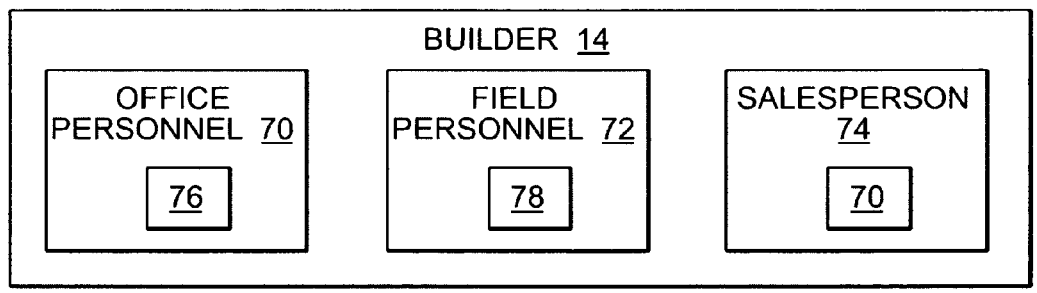
FIG. 5 is a block diagram illustrating an exemplary embodiment of a builder included in the construction work management system of FIG. 2.

Builder 12 sells new homes (not shown) to homeowners 11 and contracts with various trade contractors 13 to construct and repair the new homes. In one embodiment, builder 12 owns or is building in a plurality of developments each containing a plurality of new homes at any given time. In one embodiment, construction work management system 10 includes a plurality of builders 12. In one embodiment, as illustrated in FIG. 5, builder 12 includes multiple personnel such as office personnel 70, at least one field personnel 72, and at least one sales personnel 74.

Office personnel 70 generally performs administrative tasks including scheduling, general paperwork, and communication for builder 12. Office personnel 70 have at least one CPU 76 to facilitate connection with the network 22 and to support builder user interface 24 (illustrated in FIG. 2). Field personnel 72 generally perform the tasks associated with the developments, more particularly, overseeing construction, overseeing delivery of materials, etc. In one embodiment, field personnel 72 have at least one CPU 78 to facilitate connection of field personnel 72 to network 22 via communication link 38. In one embodiment, sales personnel 74 conduct general sales activities and homeowner recruitment programs. In one embodiment, sales personnel 74 have at least one CPU 80 configured to facilitate connection with network 22 via communication link 38. In one embodiment, the CPUs 76, 78, and 80 are similar to CPU 46 as described above. In one embodiment, at least one of CPUs 76, 78, and 80 is a tablet PC 50.

Generally, trade contractor 13 is hired by builder 12 to perform a specialized task(s) in the construction or repair of the new home (not shown). Although illustrated in FIGS. 1 and 2 as a single trade contractor 13, in one embodiment, construction work management system 10 includes a plurality of trade contractors 13. Each of the plurality of trade contractors 13 perform specialized work with regard to the new home, such as foundation work, framing, sheet rocking, siding, electrical work, plumbing work, finish work, etc.

Figure 6:
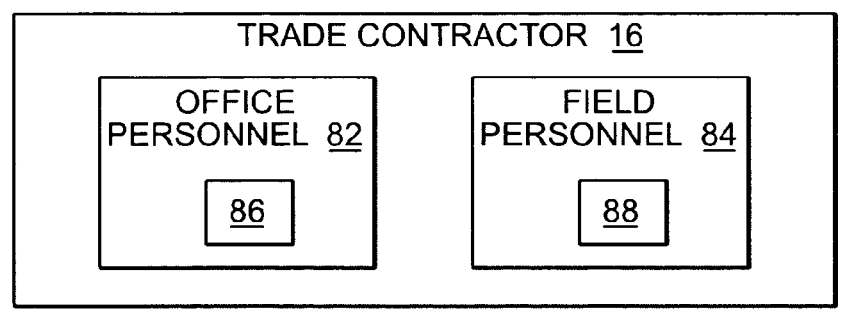
FIG. 6 is a block diagram illustrating an exemplary embodiment of a trade contractor included in the construction work management system of FIG. 2.
Figure 7:
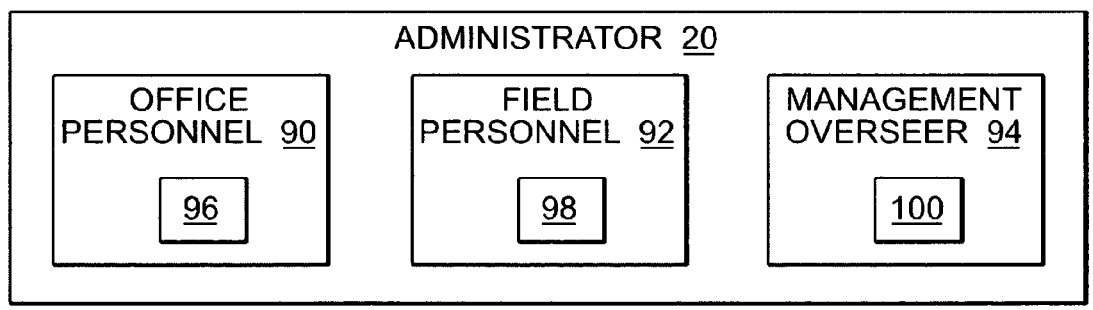
FIG. 7 is a block diagram illustrating an exemplary embodiment of an administrator included in the construction work management system of FIG. 2.

As illustrated in FIG. 6, in one embodiment, trade contractor 13 includes an office personnel 82 and at least one field personnel 84. Office personnel 82 performs administrative duties within a home or base office with the trade contractor. Field personnel 82 performs or supervises work in the field (i.e. at the new homes) regarding new construction or subsequent repair work. Each of office personnel 82 and field personnel 84 includes a CPU 86 and 88, respectively. CPUs 86 and 88 are similar to CPU 46 described above and are configured to facilitate connection to the network 22 and to support trade contactor user interface 25 (illustrated in FIG. 2). In one embodiment, at least one of the CPUs 86 or 88, most preferably CPU 88, is a tablet PC 50 as described above. In one embodiment, trade contractor 13 includes only field personnel 84 and no office personnel 82, wherein field personnel 84 performs both field and office duties. In other embodiments, office personnel 82 and field personnel 84 may share a single CPU (not shown).

In one embodiment, administrator 15 is generally responsible for maintaining database 14 and construction work management system 10 in general. In one embodiment, the administrator 15 is also responsible for field tasks such as new home orientations or walkthroughs, etc. In one embodiment, administrator 15 includes office personnel 90, field personnel 92, and a management overseer 94. Office personnel 90 performs general administrative tasks such as data entry, checks of general construction work management system 10, upkeep of database 14, processing of reports, and accounting work. In one embodiment, office personnel 90 include at least one CPU 96 configured to facilitate connection of administrator 15, more particularly office personnel 90, to network 22 and to support administrator user interface 26.

Field personnel 92 generally perform out-of-office or on-site work such as homeowner orientations, home walkthroughs, and personal communication with homeowner 11, builder 12, and/or trade contractor 13, etc. In one embodiment, field personnel 92 includes a CPU 98 capable of facilitating connection to network 22 and supporting administrator user interface 26. In one preferred embodiment, CPU 98 is a tablet PC 50 (illustrated in FIG. 4). Management overseer 94 oversees the general workings of construction work management system 10. In particular, in one embodiment, management overseer 94 provides checks on the construction work management system 10. In one embodiment, management overseer 94 includes at least one CPU 100 configured to facilitate communication with network 22 and, thereby, database 14 via communication link 42 and to support administrator user interface 26.

In one embodiment, administrator 15 including at least one of office personnel 90, field personnel 92, and management overseer 94 is optionally directly coupled to database 14 via communication link 102 as generally illustrated in FIG. 2. Notably, the descriptions of the makeup of builder 12, trade contractor 13, and administrator 15 are only exemplary embodiments, additional compositions of builder 12, trade contractor 13, and administrator 15 will be apparent to those of ordinary skill in the art.

Referring once again to FIG. 2, database 14 includes a central processor 102, a web server 104, and a data storage 106. Central processor 102 includes hardware, software, firmware, or a combination of these. In one embodiment, central processor 102 includes a computer server or other microprocessor based system capable of performing a sequence of logic operations. Web server 104 is coupled to central processor 102 via a communication link 108. Web server 104 provides interface parameters and access to central processor 102 and database 106. Web server 104 is accessed by the parties 11, 12, 13, and 15 via user interfaces 23, 24, 25, and 26 and network 22.

Data storage 106 stores one or more files for access by central processor 102 via a communication link 106. In one embodiment, data storage 106 includes volatile memory (e.g. random access memory (RAM)) and/or non-volatile memory (e.g. a hard disk drive or other persistent storage device). Data storage 106 stores information imported from homeowner 11, builder 12, trade contractor 13 and/or administrator 15 for subsequent extraction and viewing by homeowner 11, builder 12, trade contractor 13, and/or administrator 15. In one exemplary embodiment, data storage 106 of database 14 includes profile information section 110, warranty information section 112, security parameter section 114, work order information section 116, communication log 118, and collected data section 120.

Figure 8:
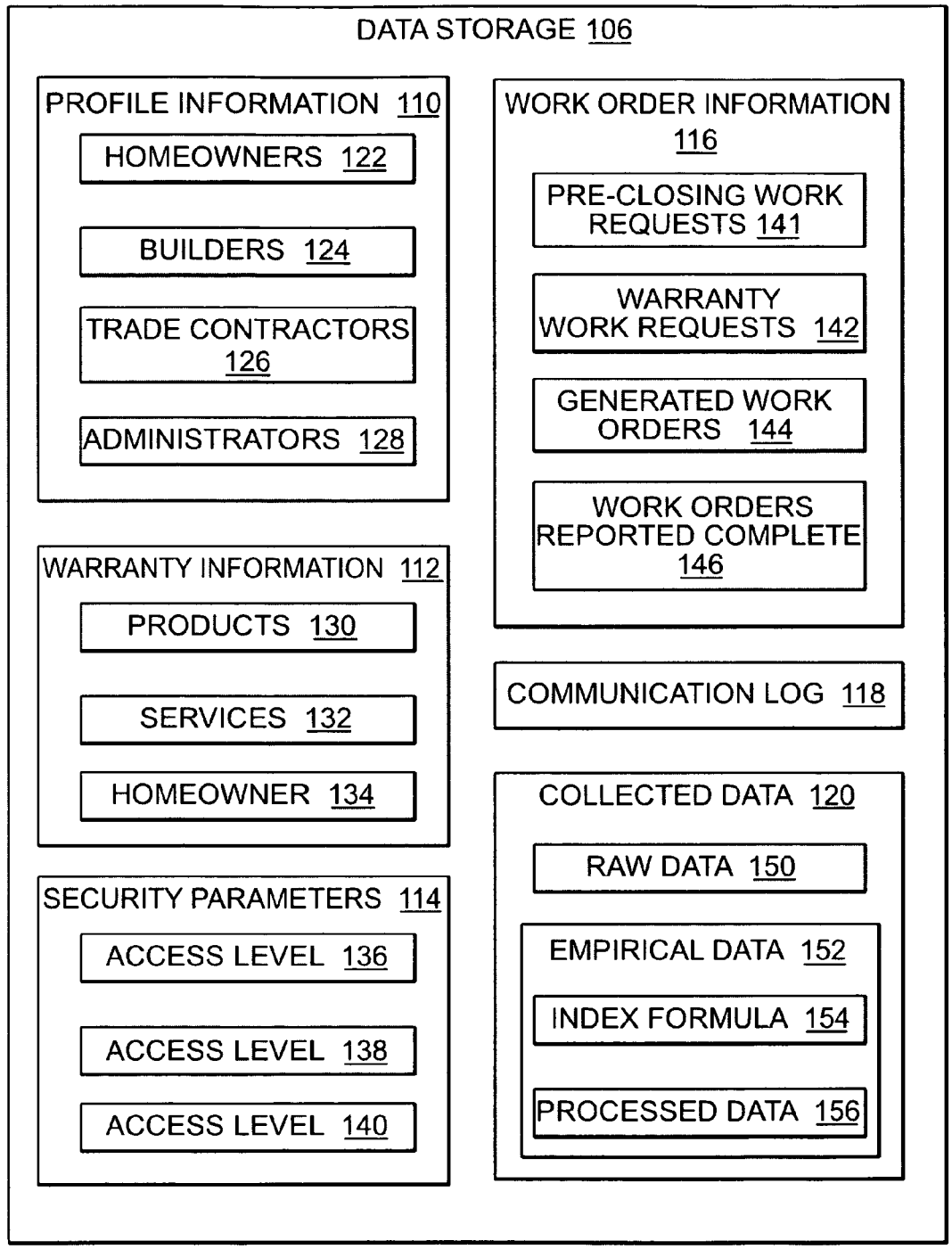
FIG. 8 is a block diagram illustrating an exemplary embodiment of a database included in the construction work management system of FIG. 2.

As illustrated in FIG. 8, in one embodiment, profile information stored in data storage 106 includes generalized profile information regarding each of homeowners 11, builders 12, trade contractor 13 and administrators 15. In one embodiment, profile information section 110 is divided into subsections 122, 124, 126, and 128 which store information regarding homeowners 11, builders 12, trade contractors 13, and administrators 15, respectively. In one embodiment, homeowner section 122 stores information regarding homeowner name, contact information, address, associated builder, contract price, user identification and password information, etc. Builder subsection 124 similarly includes names, contact information, addresses, user identification and password information, designated security or access levels, and other relevant profile information regarding builder 12 and associated personnel 70, 72, and 74. Accordingly, trade contractor section 126 includes names, contact information, addresses, user identification and password information, designated security or access levels, and other relevant information regarding each of the trade contractors 13 and associated personnel 82 and 84. Administrator subsection 128 similarly includes profile information such as names, addresses, contact information, user identification and password information, designated security or access levels, and other profile information regarding administrator 15 and associated personnel 90, 92, and 94.

Warranty information section 112 of data storage 106 includes product subsection 130, services subsection 132 and homeowner subsection 134. Product subsection 130 includes information regarding each of the plurality of products included in new homes manufactured by the plurality of builders 12. More particularly, each of the products used in home manufacture is noted as to whether or not such item is a warranty item and if such item is a warranty item, information regarding that applies to the product. Services subsection 132 of warranty information section 112 includes similar information regarding each of the individualized services used in constructing a new home. Each of the individual services used in constructing a home is noted as being a warrantable service and if a warrantable service, the associated warranty is similarly listed. Homeowner subsection 134 includes information regarding the particular home purchased by homeowner 11. As such, for each particular home, the products installed therein and services used in construction of the new home for each particular homeowner are listed and linked to the particular product or service stored in subsection 130 or 132.

Security parameter section 114 of data storage 106 defines a plurality of access levels 136, 138, or 140. Each access level 136, 138, or 140 includes a listing of all the areas of data storage 106 and an indication as to whether each area (i.e., each section or sub-section) is accessible for the particular access level 136, 138, or 140. For example, access level 136 may list the homeowner subsection 134 of the warranty information area 112 as being accessible while listing the products 130 and services 132 subsections of the warranty information area 112 as being inaccessible. With this in mind, party 11, 12, 13, or 15 or individual personnel 11, 12, 13, or 15 assigned to access level 136 will be able to access the information in the homeowner subsection 134 but will not be able to access the information stored in the products and services subsections 130 and 132 of the warranty information section 112. Similar assignments are made for all other sections and sub-sections of data storage 106 for each access level 136, 138, or 140 defined within security parameter section 114.

In one embodiment, each access level 136, 138, or 140 that defines an area of data storage 106 as being accessible, further defines each accessible area as read accessible or as read/write accessible. For example, an area defined by access level 136 as being read accessible is available to a party or individual assigned to access level 136 for viewing only. A party assigned to access level 136 does not have the ability to add new information to or edit old information within the read accessible area. In contrast, an area defined by access level 136 as being read/write accessible is available to a party or individual assigned to access level 136 for viewing as well as for adding new information to and editing information already stored in the read/write accessible area.

In one embodiment, each party 11, 12, 13, and 15 is assigned to one of the plurality of access levels 136, 138, and 140. In one embodiment, each individual personnel member included within each party 11, 12, 13, and 15 is assigned to one of the plurality of access levels 136, 138, and 140. It should be noted that security parameters section 114 is illustrated with three access levels 136, 138, or 140 for illustrative purposes only. Security parameters section 114 can define any number of access levels.

Work order information section 116 includes data replacing or at least supplementing the conventional paper work order. Work order information section 116 includes a pre-closing work request subsection 141, a warranty work request subsection 142, a generated work order subsection 144, a work orders complete subsection 146. Notably, although subsections 141, 142, 144, and 146 of work order information section 116 are described as being subsections for illustrative purposes, in one embodiment, the data stored in subsections 141, 142, 144, and 146 are stored in the same or undivided area of work order information section 116. In such an embodiment, each entry includes an identifier or flag indicating if the data entry is a warranty or pre-closing work request, a generated work order, or a work order reported complete.

Pre-closing work request subsection 141 includes requests for work to be completed on a home that are registered or generated before homeowner 11 has taken possession of the home, and are not subject to the builder's limited warranty. In one embodiment, pre-closing work requests subsection 141 includes information gathered during scheduled pre-closing or new home orientation walk-throughs conducted by administrator 15 or builder 12 with or without homeowner 11.

Work requests subsection 142 includes requests for warranty work to be completed on a home or inquiries as to whether an item of concern falls within the builder's limited warranty as submitted by homeowner 11 or other party 12, 13, or 15 for work to be done on a particular home after the homeowner has taken possession of the home. In one embodiment, work requests subsection 142 includes information gathered during scheduled home walk-throughs.

Both Pre-Closing and Warranty work requests that have been verified as real and as falling within a builder's limited warranty or falling within a realm of courtesy or complimentary services are converted to actual work orders. Such work orders are ready to be assigned to a trade contractor 13 for action. Once the work order is assigned, trade contractor 13 completes the work order action, trade contractor 13 reports the work order complete and the record of the completion report is stored in work orders reported complete subsection 146.

Notably, in one embodiment, entries stored in work order information section 116 generally include historical information on an individual, per-item basis. This historical information generally includes both system-generated records and user-created information, including a label of the time and date at which the entry was created, when it was completed, and any system-generated communication that took place in the pursuit of completing the work order item.

Communication log 118 stores a record of all communication between the parties 11, 12, 13, and 15 sent via network 22. Each communication is stored with an identifying label including the time and date of the communication and the parties 11, 12, 13, or 15 or personnel within the party 11, 12, 13, or 15 that participated in the communication. In one embodiment, the identifying label includes information regarding the home or homeowner 11, the development, and/or the general topic to which the communication relates. In one embodiment, communication log 118 catalogues the communication records based upon the information contained in the identification label. Cataloguing of the communication records facilitates subsequent location of and access to the communication record by a party 11, 12, 13, or 15.

In one embodiment, communication log 118 includes a contact log, which organizes entries in communication log 118 based upon the work order item the communication entry relates to. Such organization allows, communication entries that pertain to a particular work order item to be easily located for viewing by administrator 15, builder 12, and/or trade contractor 13.

Collected data section 120 includes statistics and data recorded by construction work management system 10. In particular, collected data section 120 includes raw data subsection 150 and empirical data subsection 152. Raw data subsection 150 includes raw data ascertained by construction work management system 10. In one embodiment, raw data subsection includes information regarding at least one of the number of work requests, the number of generated work orders, the number of work orders verified complete, the number of work orders outstanding, the time required to complete a work order, satisfaction or dissatisfaction data, data concerning the labor hours or cost to complete a work order action, the number of homes within the warranty period, etc. In one embodiment, entries in raw data subsection 150 may be preliminarily sorted by homeowner 11, builder 12, and/or trade contractor 13.

Empirical data subsection 152 includes an index formula subsection 154 and a processed data subsection 156. Index formula subsection 154 includes a listing of various formulas used to create empirical data regarding a particular homeowner 11, builder 12, or trade contractor 13 and/or to create more generalized empirical data. Processed data subsection 156 includes the empirical data or information obtained when the index formulas stored in index formula subsection 154 are applied to the raw or sorted data entries stored in raw data subsection 150. In one embodiment, the empirical data provides comparison standards allowing builders 12 and trade contractors 13 to compare their performance with other builders 12 and trade contractors 13.

In one embodiment, index formula subsection 154 includes a group of six reports, collectively known as "data comparison reports". These reports include, but are not limited to a Builder Efficiency Ratio (BER) formula, a Builder Warranty Average (BWA) formula, a Pre-Closing Management Ratio (PMR) formula, a Pre-Closing Completion Average (PCA) formula, a Trade Contractor Performance Ratio (TPR) formula, a Trade Contractor Completion Average (TCA) formula, and/or formulas for other ratios or indexes as will be apparent to those of ordinary skill in the art. In one embodiment, the empirical data stored in processed data subsection 156 corresponding to the index formulas stored in index formula subsection 154 includes a Builder Efficiency Ratio (BER), a Builder Warranty Average (BWA), a Pre-Closing Management Ratio (PMR), a Pre-Closing Completion Average (PCA), a Trade Contractor Performance Ratio (TPR), and/or a Trade Contractor Completion Average (TCA). The empirical data stored in processed data subsection 156 may further be sorted, archived, and/or manipulated to show trends or other phenomenon in the empirical data. In one embodiment, comparisons, ratios, and/or indexes are calculated with work order information logged during the past 30 days. However, builders 12 and/or trade contractors 13 can vary the number of days for which the comparisons are calculated in builder subsection 124 and trade contractor subsection 126 of profile information section 110, respectively.

In one embodiment, the BER formula takes the total number of warranty items that are incomplete for all homes that an individual builder 12 currently has within the applicable statutory limited warranty period divided by the number of homes builder 12 currently has within the statutory limited warranty period. The statutory limited warranty period is a state mandated time period builder 12 is responsible for rectifying certain warrantable defects measured from the date of sale (i.e., the closing date) of the home. The statutory limited warranty period typically falls within the range of one or two years. The BER is expressed as a decimal. In one embodiment, the BER generally falls between 0.00 an 4.00 with 0.00 being a perfect, although unlikely, BER. A low BER indicates a high-functioning builder 12 from both a construction and a warranty perspective.

The BWA applies to builders and is the average completion time of all warranty work that is assigned for a builder during a given time period. The ratio is expressed as a whole number of days. In one embodiment, the BWA falls between five and sixty days. A low BWA indicates that builder 12 generally has a good relationship between builder 12 and trade contractors 13 associated with builder 12.

The PMR applies to builders 12 and is determined by applying the customer ratio formula taking the average number of pre-closing work requests identified during new home orientation that are agreed upon by builder 12 and converted to a pre-closing work order divided by the average number of requested repairs identified during a pre-closing orientation, walkthrough, or other means of final inspection prior to completion and buyer occupancy of the home. The PMR is expressed as a percentage, with the ideal PMR being 100%. A high PMR indicates that builder 12 generally has good communication and a properly functioning construction process.

In one embodiment, the PCA applies to builders 12 and is a ratio that is determined by following the PCA formula. The PCA formula is then determined by taking the number of pre-closing work orders that are completed before buyer occupancy, divided by the total number of pre-closing work orders. The pre-closing work orders are work orders that have been generated as the result of a pre-closing orientation, walkthrough, or other means of final inspection prior to completion and buyer possession of the home (i.e., pre-closing work requests that have been approved by the builder and converted to pre-closing work orders). With this in mind, in order to determine the PCA, construction work management system 10 records how many of those pre-closing work orders are created and how many are completed before the date of buyer possession. The PCA is expressed as a percentage, with the ideal PCA being 100%. A high PCA indicates that builder 12 generally has good follow-up on home orientation work requests.

The TPR applies to trade contractors 13 and is determined by the TPR formula, which takes the expected completion time for warranty work orders assigned to a particular trade contractor 13 as assigned by a particular builder 12 divided by the average work order completion time of a trade contractor 13 for the particular builder 12. The TPR is expressed as a percentage and can exceed 100% if trade contractor 13 is completing work orders faster than builder 12 expected. A TPR that is near, at, or above 100% indicates good performance or warranty work completion by a trade contractor.

The TCA applies to trade contractors 13 and is the equivalent of the BWA as applied to builders 12. The TCA is equal to the average completion time of all warranty work orders assigned to a particular trade contractor 13 as expressed in a number of days. An efficient trade contractor 13 will have a Completion Time near or below the average number of days expected by builder 12. Notably, the builder can also monitor the trade contractor's success at completing assigned work within the allotted time frame as a ratio, expressed as a TPR, as described above.

Homeowner Options

Figure 9:
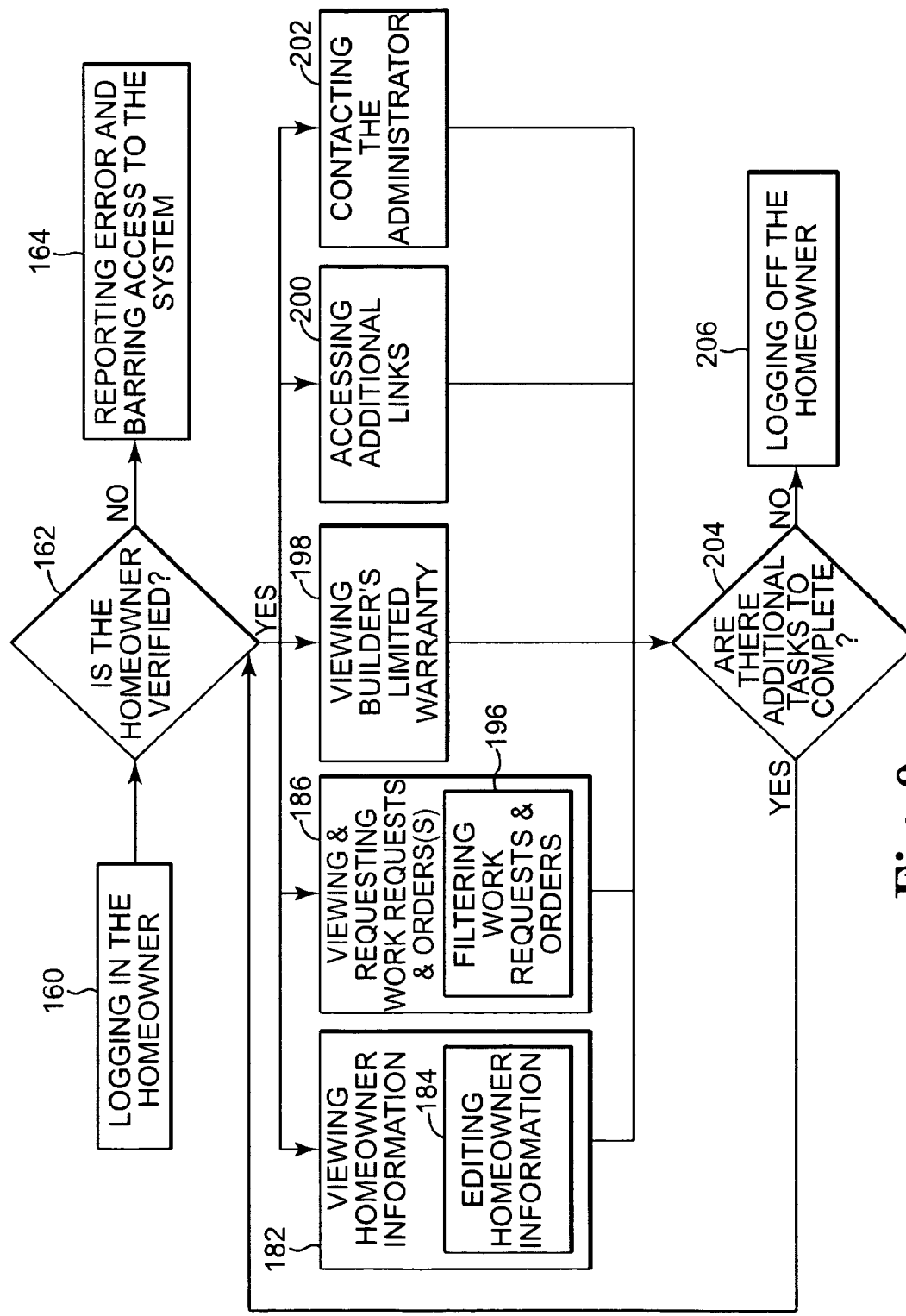
FIG. 9 is a flow chart illustrating an exemplary embodiment of a method of homeowner interaction with the construction work management system of FIG. 2.

The process of homeowner 11 accessing construction work management system 10 is generally illustrated in the flow chart of FIG. 9. At 160, homeowner 11 logs or at least attempts to log into construction work management system 10. In order to log in to construction work management system 10, homeowner 11 enters a user identification and a password. At 162, the user identification and password entered in 160 are compared to the user identifications and passwords included in homeowner subsection 122 of profile information section 110 of data storage 106 If the user identification and password entered in 160 fail to match the user identifications and the passwords within homeowner subsection 122, homeowner 11 is not verified and an error is reported to homeowner 11 and homeowner 11 is barred from accessing network 22 and, thereby, construction work management system 10 at 164.

Figure 10:
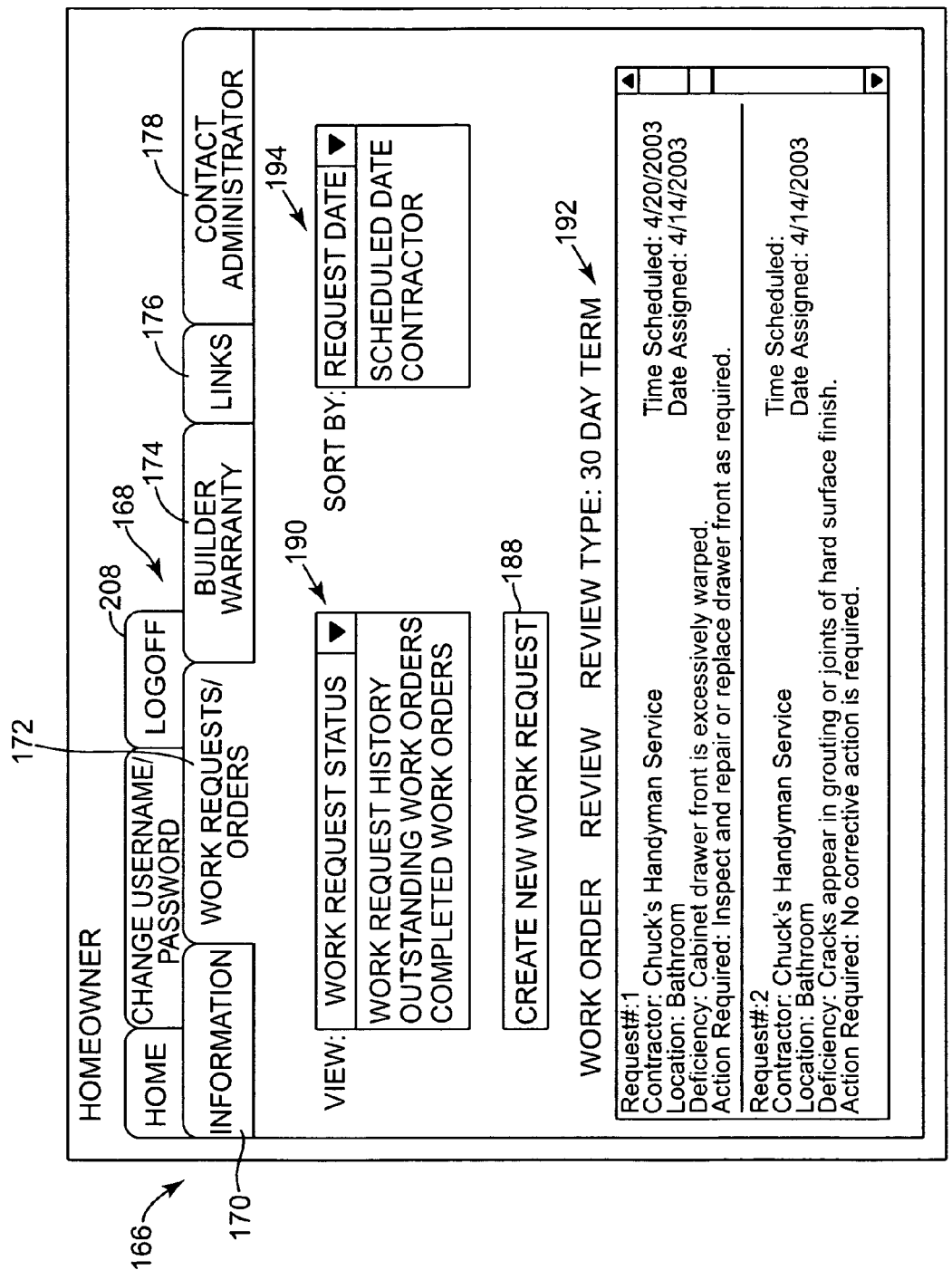
FIG. 10 is a diagram illustrating an exemplary embodiment of a homeowner interface screen for use in the method of FIG. 9.

If the user identification and password entered in 160 matches a user identification and password pair stored in homeowner subsection 122 of data storage 106, homeowner 11 is allowed access to construction work management system 10 and is presented with a homeowner interface screen presenting a plurality of homeowner options. One exemplary embodiment of a homeowner interface screen 166 is generally illustrated with additional reference to FIG. 10 at 166. Homeowner interface screen 166 includes a plurality of tabs 168 with each tab 168 representing a different action option presented to homeowner 11. In one embodiment, the plurality of tabs 168 includes an information tab 170, a work requests and work order tab 172, a builder limited warranty tab 174, a link tab 176, and a contact administrator tab 178. Notably, although described as tabs 168 for illustrative purposes, organization of homeowner options can be arranged as any type of menu options or in any arrangement generally selectable and apparent to homeowner 11.

Upon selection of information tab 170, homeowner 11 views the homeowner information stored in profile information section 110 of data storage 106 (illustrated in FIG. 8) that corresponds to the particular homeowner 11 at step 182. Homeowner information includes, but is not limited to, name, phone numbers, e-mail, and address for homeowner 11. In one embodiment, viewing homeowner information at 182 includes editing or updating the homeowner information currently stored in profile information section 110 of data storage 104 at 184.

At 186, homeowner 11 views work orders upon selection of work order tab 172 homeowner 11 can choose to view work requests, work request history, outstanding work orders, completed work orders, etc. for the new home of homeowner 11 by selecting a data set to display from view menu 190. The selected data set is displayed in window 192.

In one embodiment, viewing work orders at 186 includes further adjusting the selected view by filtering or sorting the data selected from menu 190. Selecting a sorting method from sort menu 194, automatically updates the display in window 192 at 196 to incorporate the sort criteria selected. In one embodiment, homeowner 11 can choose to sort the selected data by request date, schedule date, assigned contractor, or any of a number of parameters as will be apparent to one of skill in the art. In one embodiment, homeowner 11 can contact administrator 15 directly through construction work management system 10 from this work order view on an individual-item basis by using a communication link included in each work order item.

At 198, homeowner 11 views the builder's limited warranty on their new home by selecting builder's limited warranty tab 174. Homeowner 11, more precisely, views a list of warrantable products and services in their home as well as the corresponding warranty description. In one embodiment, homeowner 11 can automatically search for products and services included in the warranty information. In one embodiment, at 198, homeowner 11 can also view general information regarding the process for repairing warranty work, the purpose of the limited warranty, or other general warranty provisions.

At 200, homeowner 11 is provided with access to one or more hyperlinks to related websites or databases upon selection of links tab 176. The hyperlinks provided may relate to home products to buy, educational materials for new homeowners, home maintenance tips, or other information generally of interest to new homeowners. At 202, homeowner 11 is permitted an opportunity to contact administrator 15 by selecting contact administrator tab 178. Upon selection of contact administrator tab 178, homeowner 11 is able to e-mail administrator 15 through database 14. In one embodiment, homeowner 11 also can contact builder 12 or trade contractor 13 via e-mail through database 14 at this point as well. In one embodiment, homeowner 11 can e-mail builder 12, trade contractor 13, and/or administrator 15 directly from at least one of the homeowner interface screens described above.

After completing step 182, 186, 198, 200, or 202, homeowner 11 decides if there are additional tasks homeowner 11 wishes to complete. If there are additional tasks homeowner 11 wishes to complete, homeowner 11 once again selects from the plurality of tabs 170 and completes the corresponding step 182, 186, 198, 200, or 202. If homeowner 11 does not have additional tasks to complete, at 206, homeowner 11 selects log off tab 208 and is, consequently, logged off of network 22 and, therefore, off of construction work management system 10.

At their leisure, homeowner 11 can repeat this process at any time twenty-four hours a day and seven days a week to determine or provide information regarding their new home and any related warranty work. In one embodiment, homeowner 11 can also view communication records stored in communication log 118 (illustrated in FIG. 8) between homeowner 11, builder 12 and/or trade contractor 13 regarding work requests and work orders for the new home of homeowner 11.

Builder Options

Figure 11:
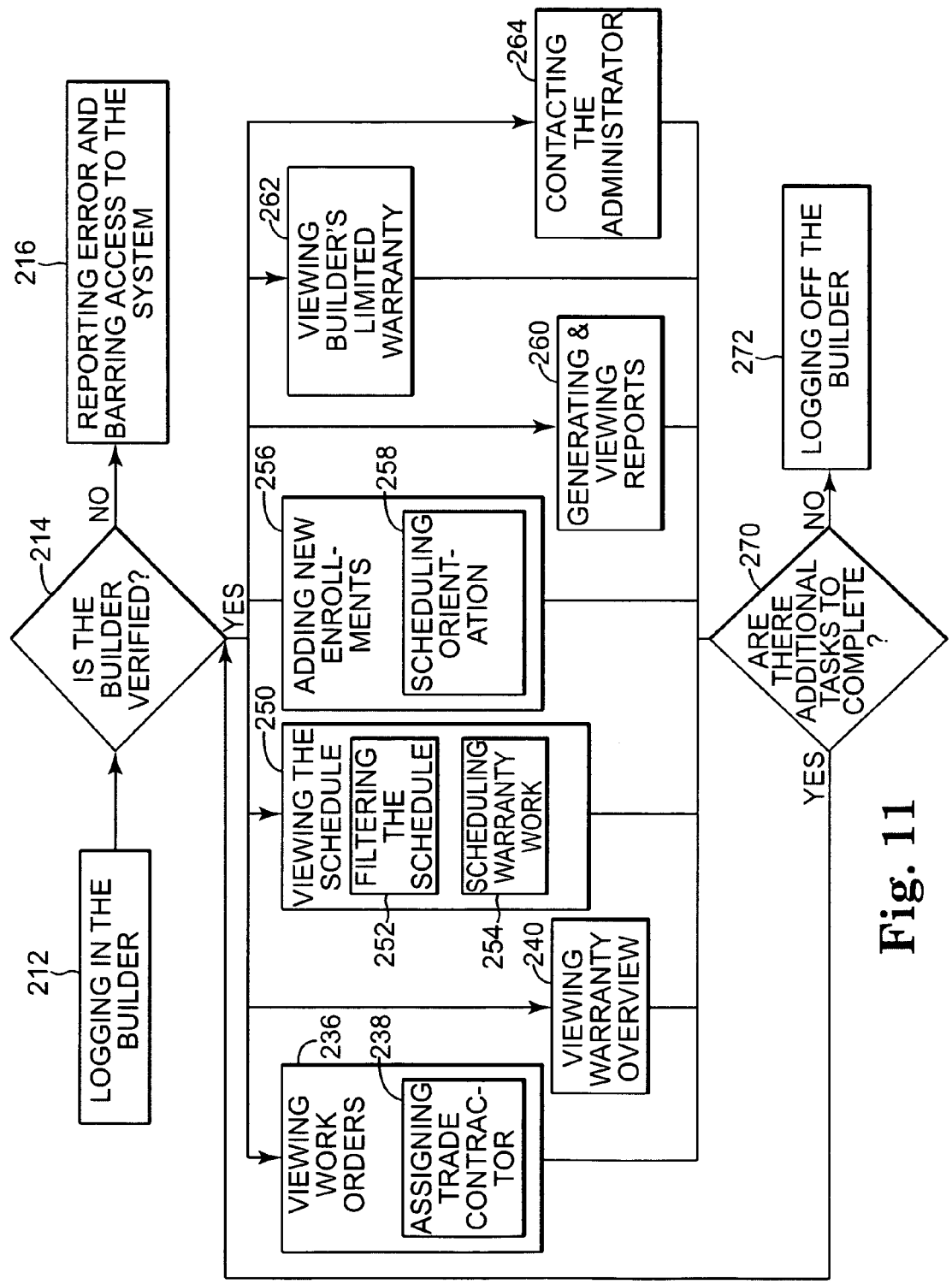
FIG. 11 is a flow chart illustrating an exemplary embodiment of a method of a builder interaction with the construction work management system of FIG. 2.

The process of builder 12 accessing construction work management system 10 is generally illustrated in the flow chart of FIG. 11. At 212, builder 12 logs or at least attempts to log into the construction work management system 10. In particular, builder 12 enters a user identification and a password. At 214, construction work management system 10 compares the user identification and password entered in 121 to the user identifications and passwords included in builder subsection 124 of profile information section 110 of data storage 106. If the user identification and password entered in 212 fail to match the user identifications and the passwords stored within builder subsection 124, builder 12 is not verified, an error is reported to builder 12, and builder 12 is barred from accessing network 22 and, thereby, construction work management system 10 at 216.

Figure 12:
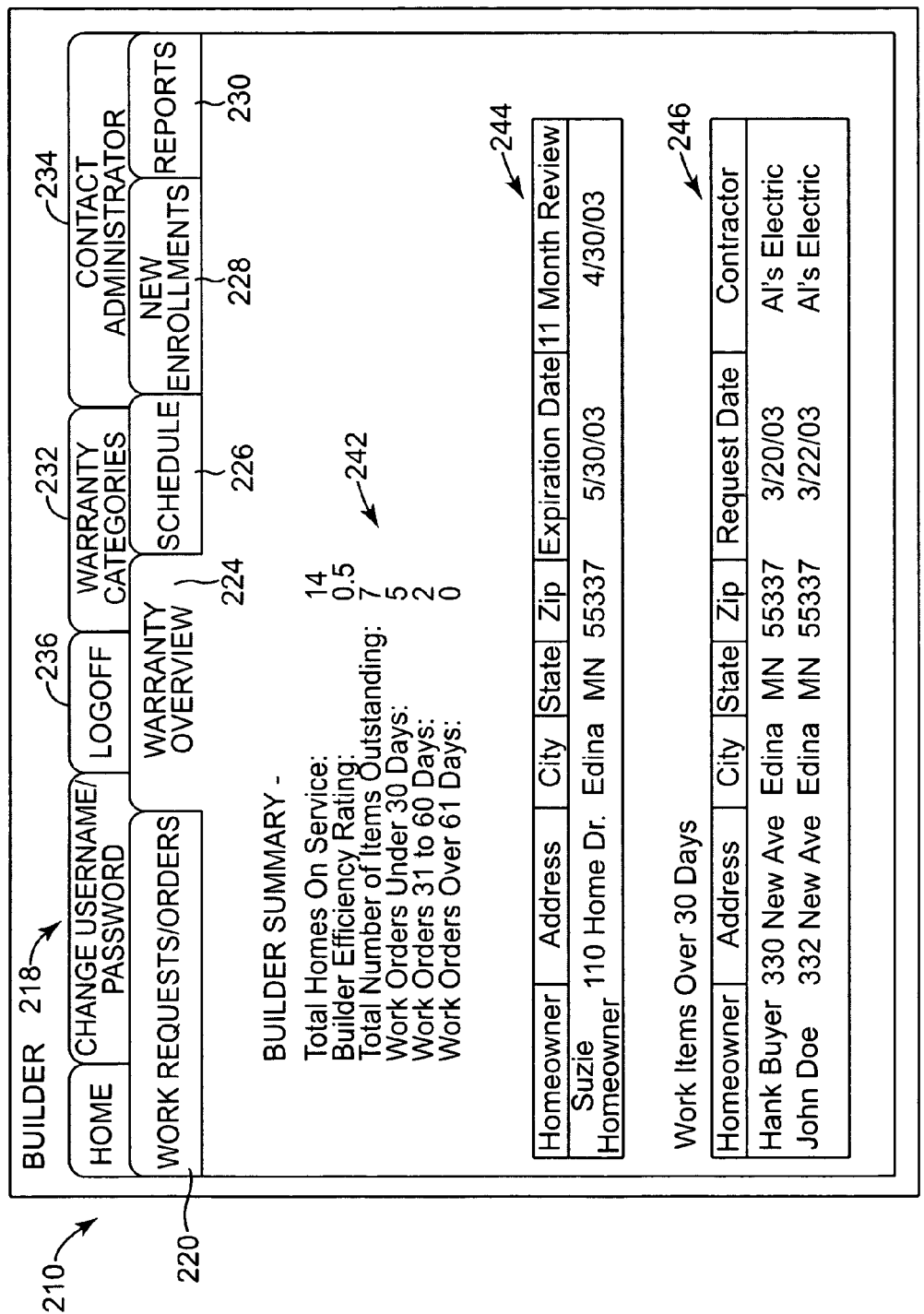
FIG. 12 is a diagram illustrating an exemplary embodiment of a builder menu display screen for use in the method of FIG. 11.

If the user identification and password entered in 212 matches a user identification and password pair stored in builder subsection 124 of data storage 106, builder 12 is allowed to further access construction work management system 10 and is presented with a builder interface screen presenting a plurality of option tabs 218. One exemplary embodiment of builder interface screen 210 is illustrated in FIG. 12. In one embodiment, the plurality of tabs 218 of builder interface screen 210 each represents a different course of action for builder 12. In one embodiment, the plurality of tabs 218 includes a work request and work order tab 220, a warranty overview tab 222, a schedule tab 224, a new enrollments tab 226, a report tab 228, a warranty categories tab 230, a contact administrator tab 232, and a log off tab 234. Notably, although described as tabs 218 for illustrative purposes, organization of builder options can be arranged as any type of menu options or in any arrangement generally selectable and apparent to builder 12.

Upon builder 12 selection of work order tab 220, at 236, builder 12 views work requests generated individually by homeowner 11 or generated by field personnel 72 and entered into the system by a site administrator 15 following an orientation, walk-thru, or inspection of the new home and stored in work orders subsections 141 or 142 of data storage 21 (illustrated in FIG. 8). In one embodiment, work requests are presented to builder 12 with a notation as to whether the work request is a warranty or a non-warranty issue as determined by administrator 15 or in an automatic procedure of construction work management system 10. In one embodiment, viewing work orders at 236 includes assigning a particular trade contractor 13 to each work request including a warranty issue at 238. Additionally, at 238, builder 12 may choose to assign a particular trade contractor 13 to work requests including a non-warranty issue as a complimentary service to homeowner 11. Each work request assigned to a trade contractor 13 is considered a work order and is consequently stored in generated work orders subsection 144 of data storage 106. In one embodiment, builder 12 also can view entries in communication log 118, including the contact log, from the work orders viewed at 236.

At 240, upon builder selection of warranty overview tab 224, builder 12 is provided with a brief look at the current condition of the warranty work corresponding to builder 12. The warranty overview functions as an executive summary of the builder's warranty work. In one embodiment, the warranty overview includes three parts: the outstanding work items summary 242, a list of homeowners whose limited warranty expires within sixty days 244, and a list of all outstanding warranty work that is over thirty days old 246. Outstanding work items summary 242 may include the total numbers of homes builder 12 has entered into construction work management system 10, the Builder Efficiency Ratio (BER), the total number of outstanding work orders, and the number of outstanding work orders under thirty days old, between thirty-one and sixty days old and over sixty days old. In one embodiment, the entries included in the outstanding work items summary 242 can be customized by builder 12. In one embodiment, builder 12 can contact administrator 15 directly through construction work system 10 from this view on an individual-item basis by using a communication link included in each work order item.

At 250, upon selection of schedule tab 226, builder 12 views a schedule of work order repairs, new home orientations, pre-closing and eleven month walk-throughs, etc. Viewing the schedule 250 may include filtering or sorting the view of the schedule based upon any number of parameters, such as homeowner 11, trade contractor 13, city, development, date, time, etc. at 252. In one embodiment, viewing the schedule 250 includes scheduling additional warranty work or rescheduling additional warranty work at 254. In one embodiment, the builder personnel 70, 72, or 74 can only change the schedule for work that the particular personnel 70, 72, or 74 was going to perform. In one embodiment, the items on the schedule that builder 12 can edit or add is determined by the access level assigned to the builder 12. Notably, upon viewing the schedule at 250, builder 12 is not required to filter the schedule 252, or schedule warranty work at 254. At 256, upon selection of new enrollments tab 228, builder 12 enters new enrollments (i.e., new homeowners 11 buying from builder 12) to be serviced by construction work management system 10. When entering new enrollments, builder 12 enters information such as homeowner name, contact information, expected closing date, requested orientation date, purchase price, primary contact, secondary contact, building type, development, number of contract years, name of personnel creating new enrollment, etc. New enrollments added at 256 are stored to database 14. In one embodiment, upon entering a new enrollment at 256, builder 12 schedules the date of the new home orientation for the new enrollment at 258.

At 260, upon selection of reports tab 230, builder 12 generates and views reports. In one embodiment, the reports viewable at 260 include but are not limited to lists of outstanding work, lists of work requests, lists of homeowners 11 for builder 12, list of new enrollments, list of homeowners 11 expiring within the next thirty days, list of associated trade contractors 13, BER trends, BWA trends, PMR trends, PCR trends for associated trade contractors 13, TPR trends for associated trade contractors 13, TCA trends for associated trade contractors 13, etc. In one embodiment, at least one of the available reports can be filtered or sorted on a number of parameters, such as by homeowner 11, trade contractor 13, development, city, state, month, year, etc. In one embodiment, builder 12 contacts administrator 15 directly through construction work management system 10 from this reports view on an individual-item basis by using a communication link included in each work order item In one embodiment, builder 12 can also view communication records stored in communication log 118 (illustrated in FIG. 8) between homeowner 11, builder 12 and/or trade contractor 13 regarding work requests and work orders regarding homes of builder 12. In one embodiment, the areas available for viewing by builder 12 varies for different personnel 70, 72 and 74 (illustrated in FIG. 5) and the particulars of the access level assigned to each. At 262, upon selection of warranty categories tab 232, builder 12 can view the builder's limited warranty set-up by administrator 15 by category (i.e., by type of product or service). In viewing the various products or services, each item is designated as a warranty item or a non-warranty item. As such, builder 12 can quickly review the products or services used in new homes built by builder 12 to determine which products or services are warranty items.

At 264, builder 12 is permitted an opportunity to contact administrator 15 by selecting contact administrator tab 234. Upon selection of contact administrator tab 234, builder 12 is able to e-mail administrator 15 through database 14. In one embodiment, builder 12 can also contact homeowner 11 or trade contractor 13 via e-mail through database 14 at this point as well. In one embodiment, builder 12 can e-mail homeowner 11, trade contractor 13, and/or administrator 15 directly from at least one of the builder interface screens described above.

At 270, after completing step 236, 240, 250, 256, 260, 262 or 264, builder 12 decides if there are additional tasks builder 12 wishes to complete. If builder 12 has additional tasks to complete, builder 12 once again selects from the plurality of tabs 218 and completes the corresponding step 236, 240, 250, 256, 260, 262 or 264. If builder 12 does not have additional tasks to complete at 270, builder 12 selects log off tab 236 at 272 and, consequently, is logged off of network 22 and, thereby, construction work management system 10.

Builder 12 can repeat this process at any time twenty-four hours a day and seven days a week to determine or provide information regarding warranty work. In one embodiment, builder 12 can also view communication records stored in communication log 118 (illustrated in FIG. 8) between homeowner 11, builder 12 and/or trade contractor 13 regarding work requests and work orders regarding homes of builder 12. In one embodiment, the areas available for viewing and editing by builder 12 varies for different personnel 70, 72 and 74 (illustrated in FIG. 5) and the particulars of the access level assigned to each.

Trade Contractor Options

Figure 13:
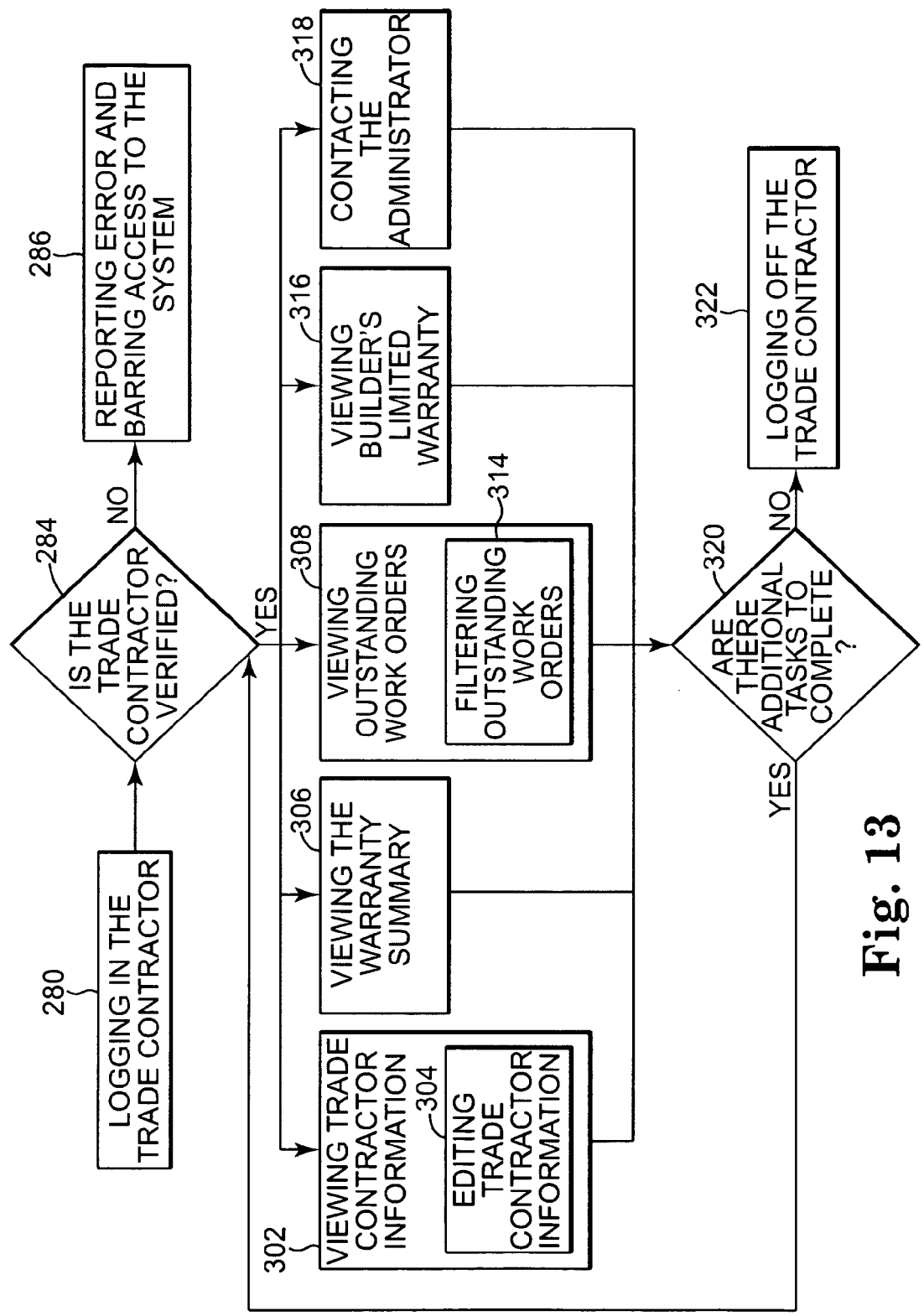
FIG. 13 is a flow chart illustrating an exemplary embodiment of a method of trade contractor interaction with the construction work management system of FIG. 2.

The process of trade contractor 13 accessing construction work management system 10 is generally illustrated in the flow chart of FIG. 13. At 280, trade contractor 13 logs into or at least attempts to log on to construction work management system 10. In particular, trade contractor 13 enters a user identification and a password. At 284, construction work management system 10 compares the user identification and password entered in 280 to the user identifications and passwords included in trade contractor subsection 126 of data storage 106. If the user identification and password entered in 280 fail to match the user identifications and the passwords stored within trade contractor subsection 126, trade contractor 13 is not verified, an error is reported to trade contractor 13, and trade contractor 13 is barred from accessing network 21 and, thereby, construction work management system 10 at 286.

Figure 14:
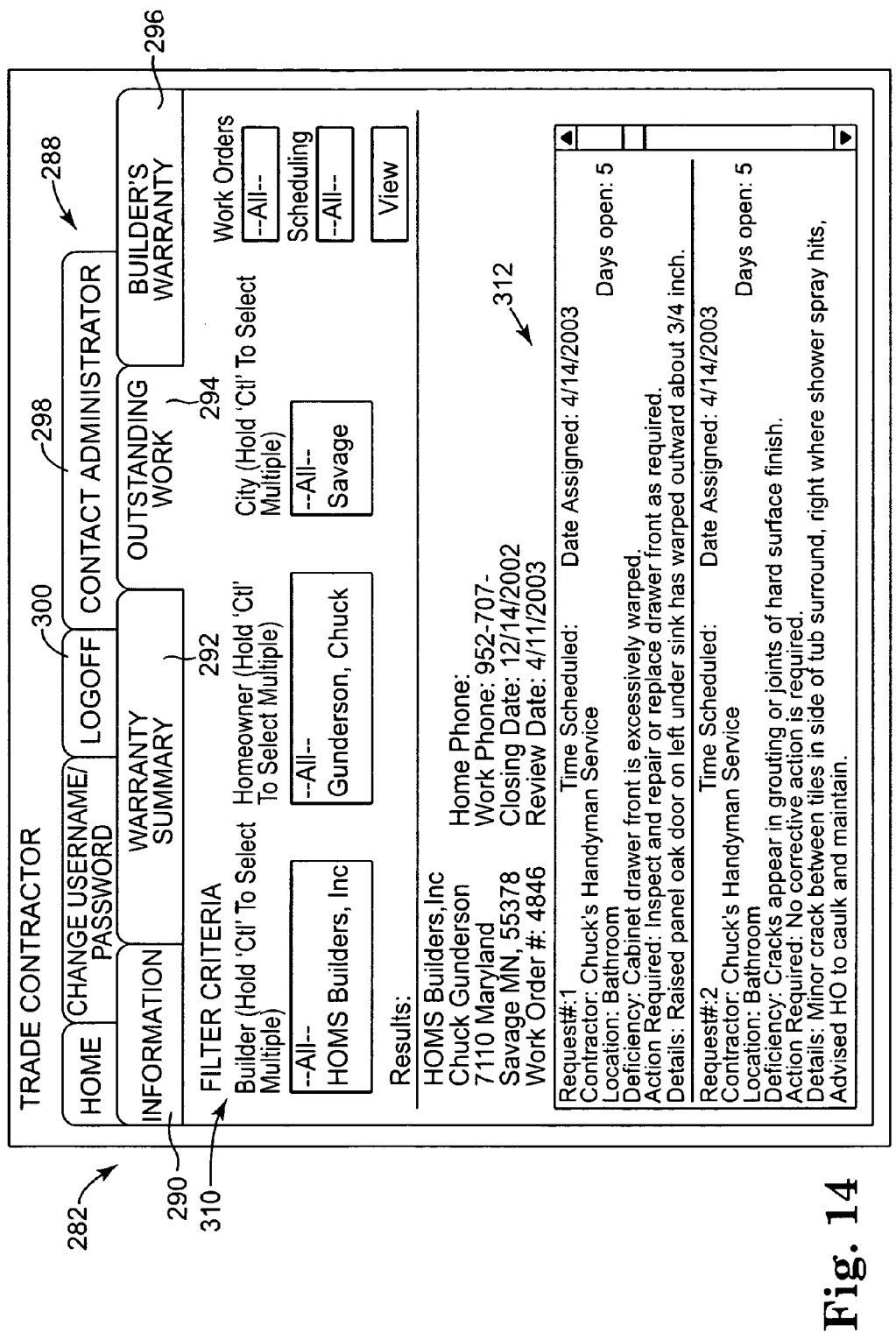
FIG. 14 is a diagram illustrating an exemplary embodiment of a trade contractor menu display screen for use in the method of FIG. 13.

If the user identification and password entered in 280 matches a user identification and password pair stored in trade contractor subsection 126 of data storage 106, trade contractor 13 is allowed to further access network 22 and construction work management system 10 and is presented with a trade contractor interface screen presenting a plurality of option tabs 288. One exemplary embodiment of trade contractor interface screen 282 is generally illustrated in FIG. 14. In one embodiment, the plurality of tabs 288 of trade contractor interface screen 282 each represent a different course of action for trade contractor 13. In one embodiment, the plurality of tabs 288 includes an information tab 290, a warranty summary tab 292, an outstanding work tab 294, a builder's limited warranty tab 296, a contact administrator tab 298, and a log off tab 300. Notably, although described as tabs 288 for illustrative purposes, organization of trade contractor options can be arranged as any type of menu options or in any arrangement generally selectable and apparent to trade contractor 13.

At 302, upon selection of information tab 290, trade contractor 13 views the trade contractor information stored in profile information section 110 of data storage 106 (illustrated in FIG. 8) that corresponds to the particular trade contractor 13. The trade contractor information includes, but is not limited to, name, phone numbers, e-mail, address, primary contact, and secondary contact for trade contractor 13. In one embodiment, viewing trade contractor information 302 includes editing or updating the trade contractor information currently stored in profile information section 110 of data storage 106 at 304.

At 306, selection of warranty summary tab 292, trade contractor 13 views the warranty summary page, which is the trade contractors equivalent of the warranty overview of builder 12, to get a brief look at the current condition of warranty work assigned to trade contractor 13. The warranty summary functions as an executive summary of the warranty work assigned to trade contractor 13. In one embodiment, the warranty overview includes a contractor summary that lists items such as the total number of work orders outstanding and assigned to trade contractor 13, such work orders under thirty days old, such work orders between thirty-one and sixty days old, and such work orders over sixty-one days old, and the average completion time (TCA) for trade contractor 13. In one embodiment, the warranty summary also includes a list of work order items under thirty days old, between thirty-one and sixty days old, and over 61 days old. In one embodiment, the warranty summary can be filtered to show all information for trade contractor 13 or to show information for trade contractor 13 with respect to a particular builder 12 that is associated with trade contractor 13. Trade contractor 13 can contact administrator 15 directly through construction work management system 10 from this view on an individual-item basis by using a communication link included in each work order item.

At 308, trade contractor 13 views a more detailed display of the outstanding work orders stored in work order information section 116 of data storage 106 upon selection of outstanding work order tab 294. The outstanding work orders are displayed in window 312. As illustrated in FIG. 14, in one embodiment while viewing outstanding work orders 308, trade contractor 13 can select filter criteria 310, if any, for sorting the outstanding work orders, which automatically updates the outstanding work orders displayed in window 312 to those fitting within the filter criteria at 314. In one embodiment, trade contractor 13 can contact administrator 15 directly through the system 10 from this view on an individual-item basis by using a communication link included in each work order item. In one embodiment, trade contractor 13 can view entries from communication log 118, including the contact log, with respect to each work order, or more specifically, with respect to each work order item, as viewed at 308. At 316, trade contractor 13 views the builder's limited warranty by selecting builder limited warranty tab 296. The builder's limited warranty, which is set-up by administrator 15, is viewable by category (i.e., by type of product or service). In viewing the various products or services, each item is designated as a warranty item or a non-warranty item. As such, trade contractor 13 can quickly review the products or services falling with the particular trade of trade contractor 13 to determine which products or services are warranty items.

At 318, trade contractor 13 is permitted an opportunity to contact administrator 15 by selecting contact administrator tab 298. Upon selection of contact administrator tab 298, trade contractor 13 is able to e-mail administrator 15 through database 14. In one embodiment, trade contractor 13 can also contact homeowner 11 or builder 12 via e-mail through database 14 at this point as well. In one embodiment, trade contractor 13 can e-mail homeowner 11, builder 12, and/or administrator 15 directly from at least one of the other builder interface screens described above.

At 320, after completing step 302, 306, 308, 316, or 318, trade contractor 13 decides if there are additional tasks trade contractor 13 wishes to complete. If there are additional tasks trade contractor 13 wishes to complete, trade contractor 13 once again selects from the plurality of tabs 288 and completes the corresponding step 302, 306, 308, 316, or 318. If trade contractor 13 does not have additional tasks to complete, at 320, trade contractor 13 selects log off tab 300 at 322 and, consequently, is logged off of network 22 and, thereby, construction work management system 10.

Trade contractor 13 can repeat this process at any time twenty-four hours a day and seven days a week to determine or provide information regarding outstanding warranty work. In one embodiment, trade contractor 13 can also view communication records stored in communication log 118 (illustrated in FIG. 8) between homeowner 11, builder 12, and/or trade contractor 13 regarding work requests and work orders assigned to trade contractor 13. In one embodiment, the areas available for viewing and editing by trade contractor 13 varies for different personnel 82 and 84 (illustrated in FIG. 6) and the particulars of the access level assigned to each.

Administrative Options

Figure 15:
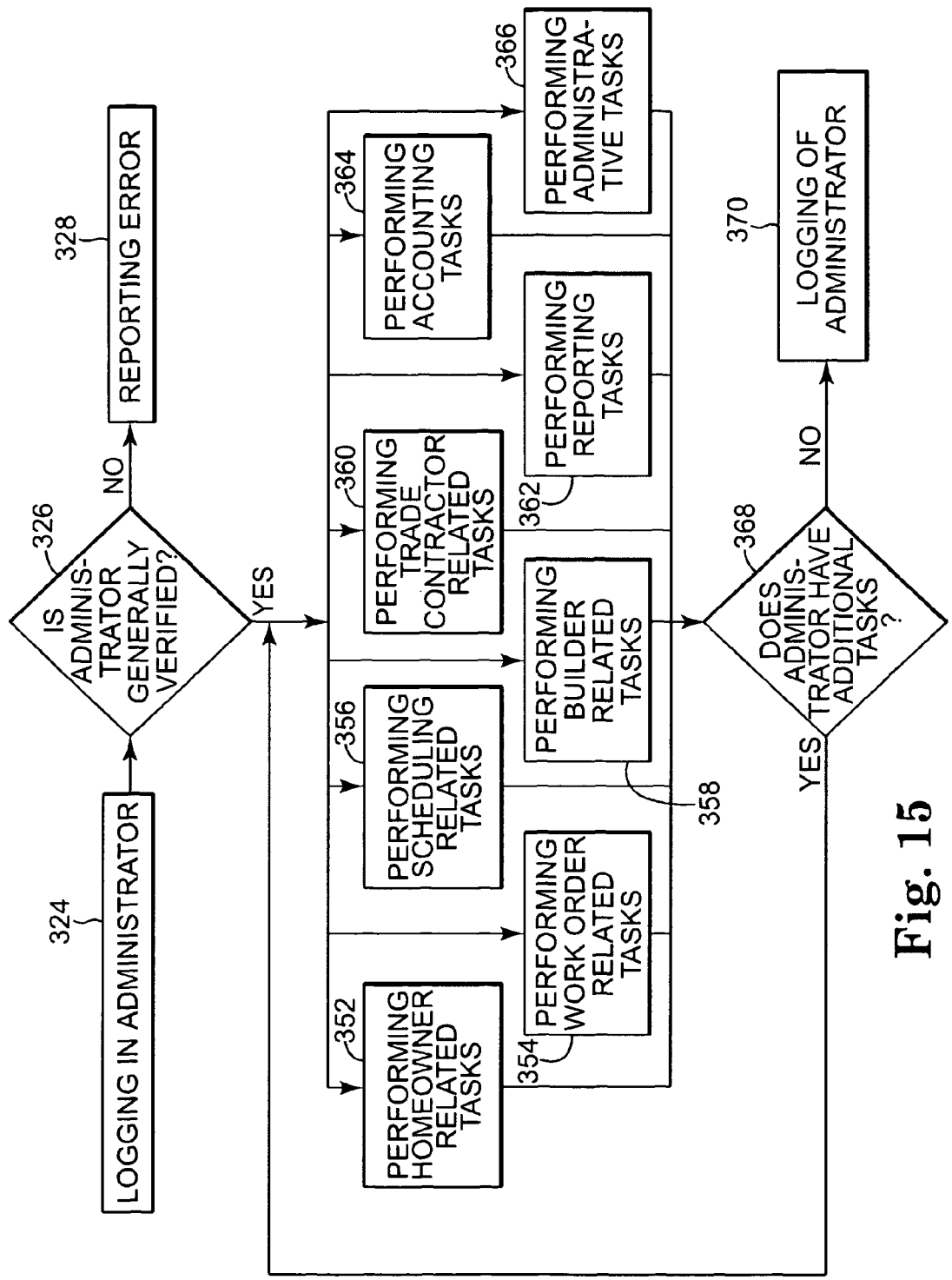
FIG. 15 is a flow chart illustrating an exemplary embodiment of a method of administrator interaction with the construction work management system of FIG. 2.

The process of administrator 15 accessing construction work management system 10 is generally illustrated in the flow chart of FIG. 15. At 324, administrator 15 logs into or at least attempts to log onto construction work management system 10. In particular, administrator 15 enters a user identification and a password. At 326, construction work management system 10 compares the user identification and password entered in 280 to the user identifications and passwords included in administrator subsection 128 of profile information section 110 of data storage 106. If the user identification and password entered in 324 fail to match the user identifications and the passwords stored within administrator subsection 128, administrator 15 is not verified, an error is reported to administrator 15, and administrator 15 is barred from accessing network 22 and, thereby, construction work management system 10 at 328.

Figure 16:
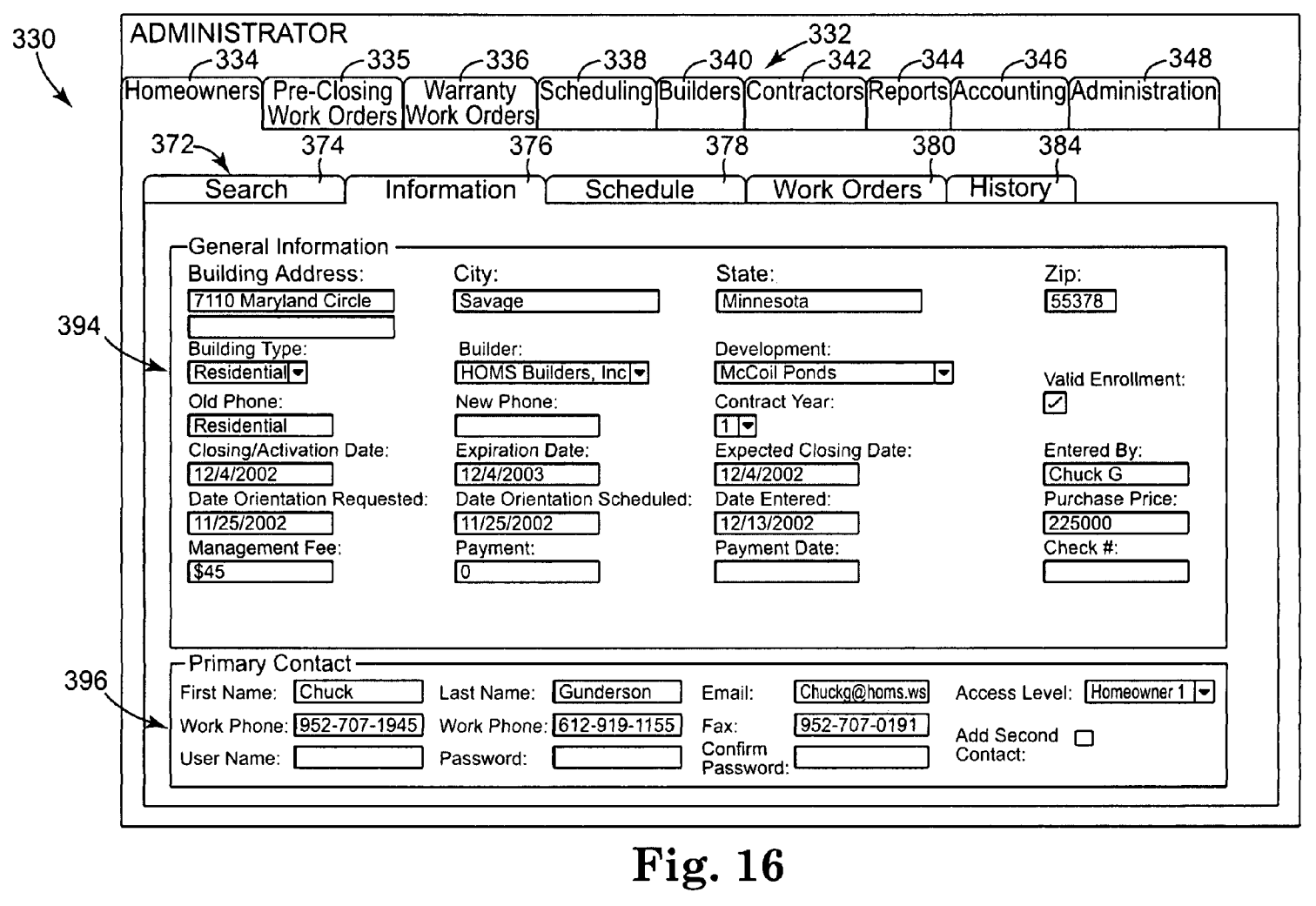

If the user identification and password entered in 324 matches a user identification and password pair stored in administrator subsection 128 of data storage 106, administrator 15 is allowed to further access network 22 and construction work management system 10 and is presented with an administrator interface screen 330, one embodiment of which is illustrated in FIG. 16, that presents a plurality of menu option tabs 332. In one embodiment, menu tabs 332 of administrator interface screen 330 each represent a different action option for administrator 15. In one embodiment, the plurality of menu tabs 330 includes a homeowner tab 334, a pre-closing work order tab 335, a warranty work order tab 336, a scheduling tab 338, a builders tab 340, a contractor tab 342, a reports tab 344, an accounting tab 346, and an administration tab 348. Notably, although described as tabs 332 for illustrative purposes, organization of administrator options can be arranged as any type of menu options or in any arrangement generally selectable and apparent to administrator 15. Similarly, as used throughout the specification all "tabs" can similarly be a menu option or other arrangement generally selectable and apparent to the related user.

As part of performing homeowner related tasks 352, at 352, upon selection of homeowner tab 334, administrator 15 is presented with a menu of action items relating to homeowner 11. At 354, upon selection of work order tab 336, administrator 15 is presented with a menu of action items relating to work orders. Similarly, at 356, 358, 360, 362, 364, and 366, upon selection of scheduling tab 338, builders tab 340, contractor tab 342, reports tab 344, accounting tab 346, and administration tab 348, administrator 15 is presented with a menu of action items relating to scheduling, builder 12, trade contractor 13, reports, accounting, and administration matters, respectively.

Homeowner Related Tasks

Upon selection of homeowner tab 334, administrator 15 is presented with a plurality of homeowner tabs 372 each relating to a particular homeowner related task at 352. In one embodiment, the plurality of homeowner tabs 372 includes a search tab 374, an information tab 376, a schedule tab 378, a work order tab 380, and a history tab 384.

Figure 17:
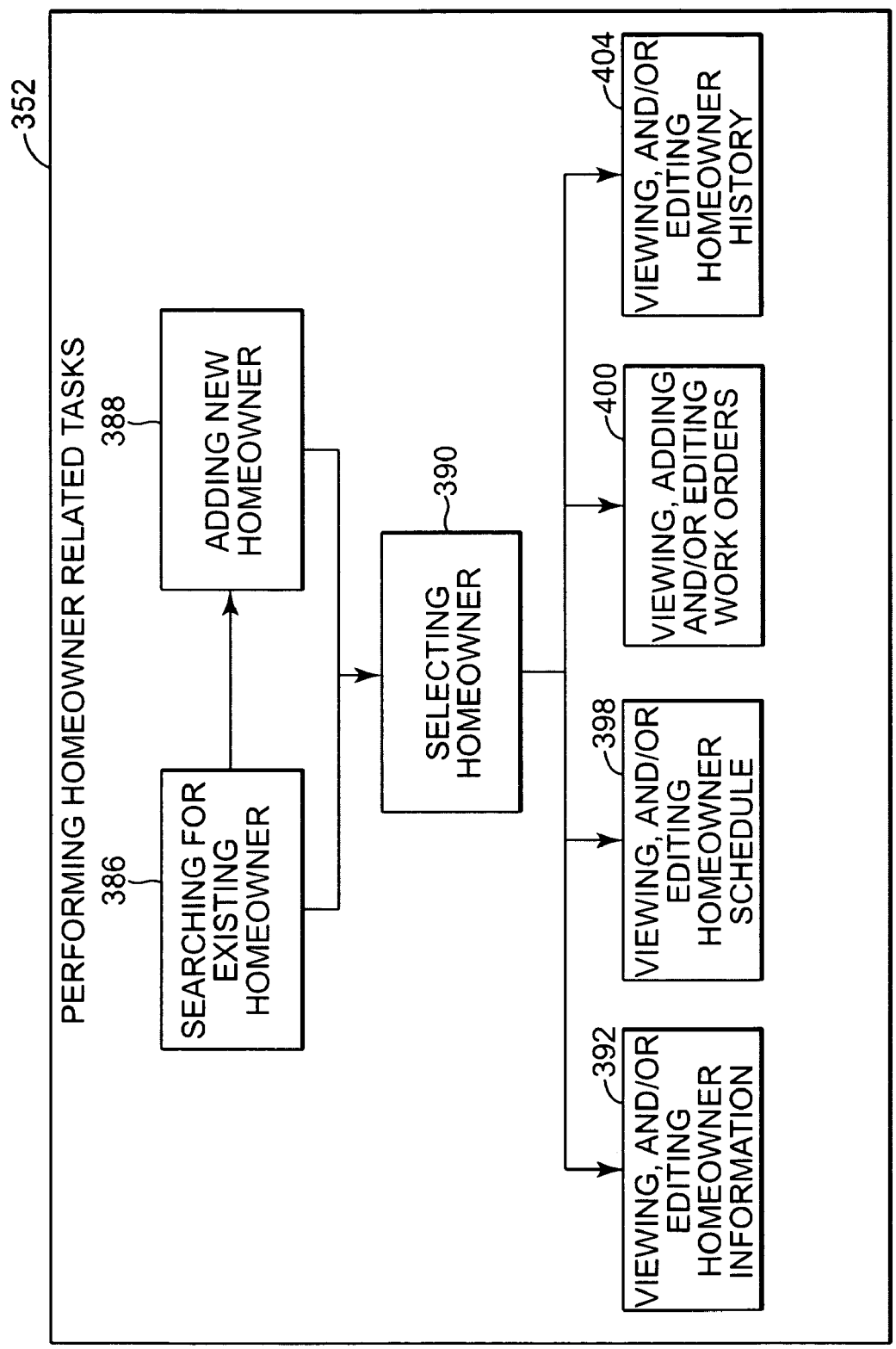
FIG. 17 is a diagram illustrating an exemplary embodiment of an administrator menu display screen for completing homeowner related tasks per the method of FIG. 15.

Additionally referring to FIG. 17, at 386, after selection of search tab 374 by administrator 15, administrator 15 searches for a particular homeowner 11 from the plurality of homeowners 11 enrolled in construction work management system 10. Administrator 15 can search for the particular homeowner 11 by way of a variety of search methods based on name, development, address, etc. If administrator 15 finds that the particular homeowner 11 is not yet enrolled in construction work management system 10, administrator 15 can add the particular homeowner 11 to construction work management system 10 at 388. Alternatively, administrator 15 can add a new homeowner at 388 without first searching for an existing homeowner at 386. If administrator 15 finds the particular homeowner 11 to already be enrolled in construction work management system 10, administrator 15 selects that homeowner 11 at 390. Similarly, upon adding the new homeowner at 388, the new homeowner 11 is selected at 390. In one embodiment, no homeowner data can be viewed until a homeowner 11 is selected at 390.

After a particular homeowner 11 is selected, administrator 15 chooses a course of action from the remainder of homeowner tabs 372. At 392, upon selection of information tab 376, administrator 15 views profile information on the particular homeowner 11 from profile information section 110 of data storage 106. In one embodiment, the profile information contains general information 394 and contact specific information 396. General information 394 includes but is not limited to an address, building type, builder, development, phone, closing date, warranty expiration date, orientation dates, management fee, and/or payment information of selected homeowner 11.

Contact specific information 396 includes information regarding an individual within the homeowner party 11. In one embodiment, contact specific information 396 includes a name, a phone number, an e-mail address, a user identification, a password, and/or an access level. In one embodiment, construction work management system 10 automatically generates a unique user identification and corresponding password. Administrator 15, depending upon the details of assigned access level, is able to add, edit, and update both general information 394 and contact specific information 396 for each homeowner 11.

At 398, after selection of schedule tab 378 by administrator 15, administrator 15 views and/or edits the homeowner schedule. In one embodiment, at 398, all scheduled appointments for the selected homeowner 11 are displayed including appointments that have already taken place or are scheduled to take place in the future with administrator 15. In another embodiment, all items scheduled for the selected homeowner 11 are displayed at 398. Administrator 15 generally is able to edit or add to the scheduled appointments.

At 400, upon selection of work order tab 380, a list of all work orders that exist for the particular homeowner 11 is displayed. Selecting one of the listed work orders opens a work order portal to the full work order and transports administrator 15 to work order menu, similar to that described below with respect to work order related tasks, where administrator 15 views, adds, and/or edits the work order records entered for the selected homeowner 11 stored in database 14. Not only is the work order itself displayed at 400, but associated information about the status of the work order such as communication records from communication log 118 (illustrated in FIG. 8) is also displayed. Work order reports can be viewed, printed, and sent to a designated homeowner 11, builder 12, or trade contractor 13 by administrator 15 directly from this view, with documentation being sent directly to the communication log 118 for subsequent viewing. Administrator 15 can edit the work order and the associated information from the screen associated with schedule tab 378. New work requests and work orders can also be created at 400 from the same screen by clicking an add work order button (not illustrated). In one embodiment, administrator 15 adds a work order by navigating through a series of dialog boxes and menu prompts (not shown).

At 404, administrator 15 views and/or edits homeowner history information upon selection of history tab 384. The homeowner history information is stored in database 14 and includes a brief history of all activity of the selected homeowner 11 in the system including dates and description of significant transactions or events. In one embodiment, at 404, administrator 15 can also view communication entries stored in communication log 118, which are relevant to the larger history of homeowner 122 with construction work management system 10, such as communications regarding enrollment date, opening and closing of work orders, system generated letters not related to work orders, and specific comments entered by administrator 15. In one embodiment, homeowner history can be viewed on a "show all" basis or in a filtered or sorted format. On a "show all" basis, all homeowner history is displayed. When sorted, only the homeowner history falling within a particular parameter(s) selected by administrator 15 is displayed.

Work Order Related Tasks

Figure 18:
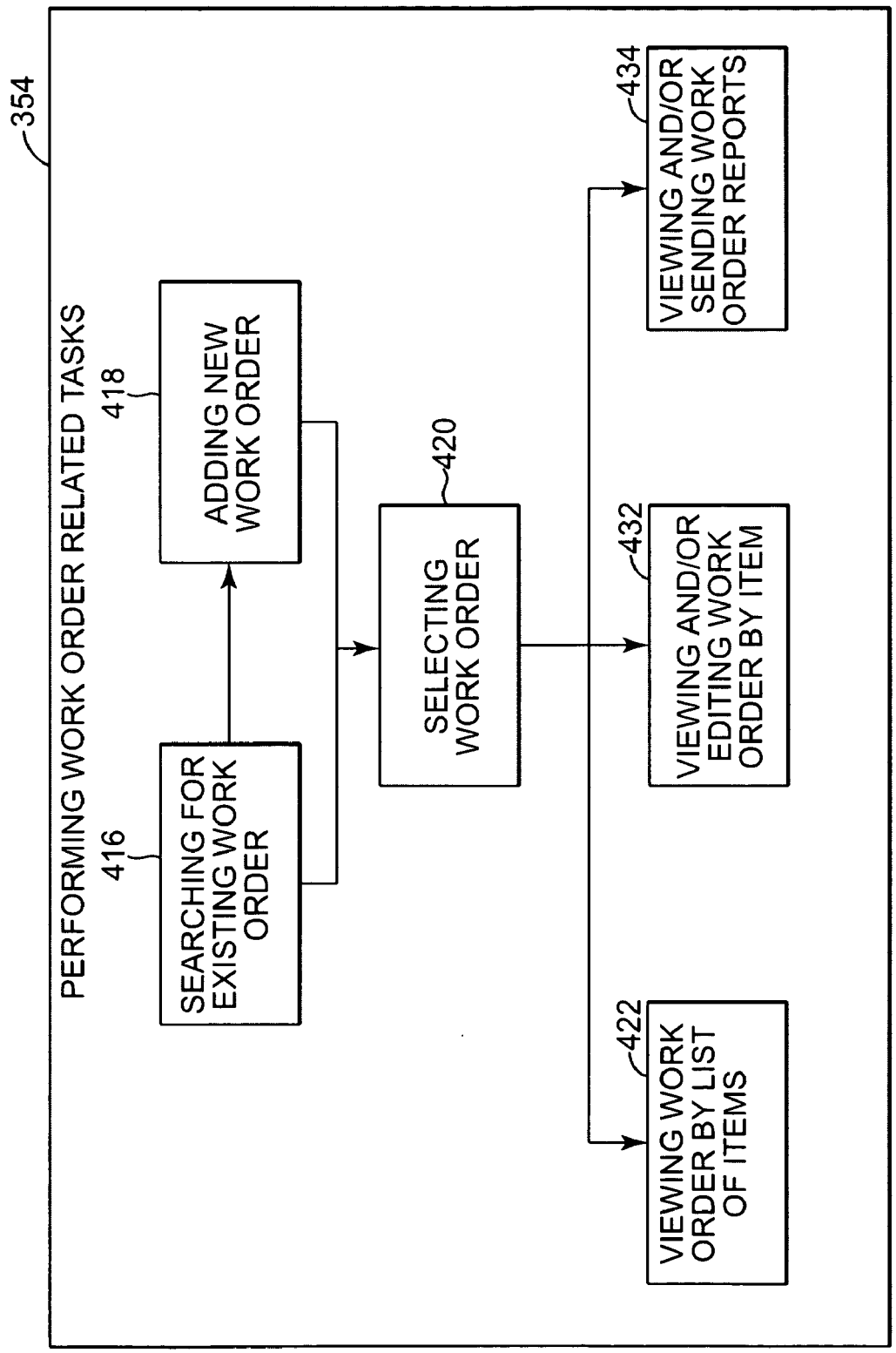
FIG. 18 is a flow chart illustrating an exemplary embodiment of a administrative method of completing work order related tasks in accordance with the flow chart of FIG. 15.
Figure 19:
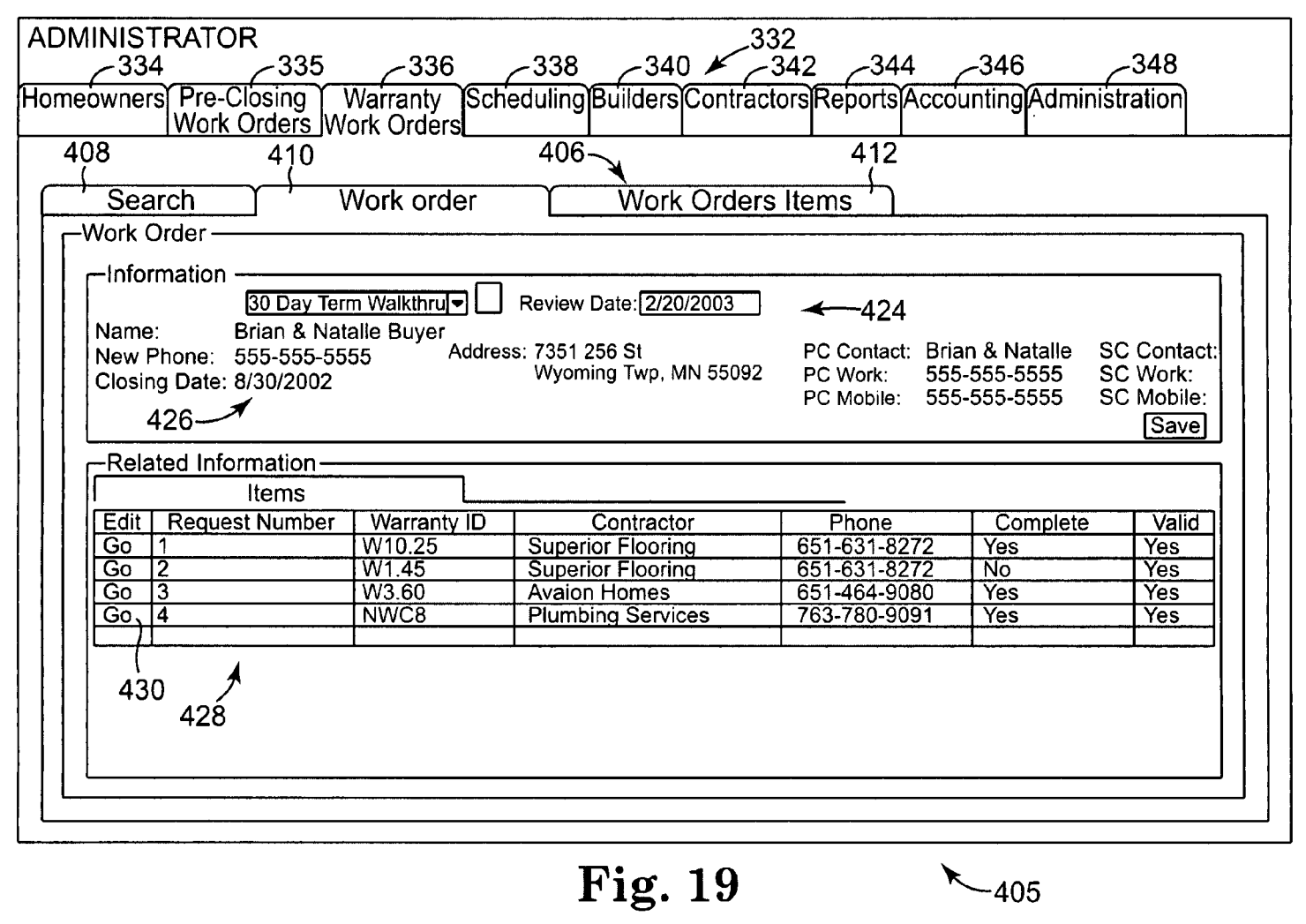

Referencing FIGS. 15, 18, and 19, wherein FIG. 19 illustrates one embodiment of an administrator screen for performing work order related tasks generally at 405. Upon selection of warranty work orders menu tab 336 or pre-closing work orders menu tab 335, administrator 15 is able to perform work order related tasks at 354, which include choosing from a plurality of work order tabs 406 including a search tab 408, a work order tab 410, and a work order items tab 412. Notably, although specifically described below with respect to warranty work orders and warranty work orders tab 336, in order to perform tasks related to pre-closing work orders, pre-closing work orders menu tab 335 is selected and steps are performed similar to those specifically described herein with respect to warranty work orders. At 416, after selection of search tab 408 by administrator 15, administrator 15 searches for a particular warranty work order from the plurality of warranty work orders stored in work order information section 116 of data storage 106 (illustrated in FIG. 8).

Administrator 15 can search for the particular work order by way of a variety of search methods based on homeowner 11, builder 12, trade contractor 13, development, date, etc. If administrator 15 finds that the particular homeowner 11 is not yet stored in work order information subsection 116, administrator 15 can add a new work order or work request at 418. Alternatively, administrator 15 can add a new work order or work request at 418 without first searching for an existing work request or order at 416. If administrator 15 finds the particular work order to already be stored in work order information subsection 116, administrator 15 selects that work order at 420. Similarly, upon adding the new work request or order at 418, the new work order is selected at 420. In one embodiment, no work order data can be viewed until a work order is selected at 420.

After a particular work request or work order is selected, administrator 15 chooses a course of action from the remainder of work order tabs 406. At 422, upon selection of work order tab 410, administrator 15 views origination information 424 regarding the work order, homeowner information 426, and an item list 428 of the selected work order. Origination information 424 includes a work order identification number, appointment type in which work order was identified, and the appointment date on which the issue was identified. Homeowner information 426 includes the name of homeowner 11 and contact information of homeowner 11. Item list 428 lists all action items. By selecting a "Go" button 430, administrator 15 is redirected to the work order items tab 412 for editing of one or more of the items listed. In one embodiment, the appointment type and appointment date origination information 424 items can be edited directly from work order tab 410.

At 432, upon selection of work order item tab 412 or upon selection of a "Go" button 430, a more detailed list of the work order items is displayed. In particular, each detail in the item list is fully displayed such as request number, warranty identification, assigned trade contractor 13, trade contractor phone number, completion status, validity of completion, scheduled completion date, etc. In one embodiment, administrator 15 indicates whether the items will be displayed in a multi-edit format or a single-edit format. The multi-edit format will allow administrator 15 to edit several items at the same time. The single-edit format administrator 15 selects entries within an item one at a time to be edited one at a time. Although, the multi-edit format allows more entries to be edited at one time, the time required to effectuate the edit in database 14 is relatively long as compared to the time required to effectuate the edit in database 14 when in the single-edit format.

In one embodiment, digital images can be added to a work order item to illustrate the issue visually from scanner 58 or digital camera 60. In one embodiment, administrator 15 can also gain access to communication log 118, including the contact log, of data storage 106 (illustrated in FIG. 8) to view communications made in connection to the selected work order, or more specifically made in connection to a particular item on a selected work order. Work order items can also be deleted from data storage 106 at 432.

At 434, administrator 15 can select a current work order report from a supplemental menu. In one embodiment, current work order reports include a warranty report for homeowner 11, a scheduled work report for trade contractor 13, an unscheduled work report for trade contractor 13, and a recently assigned work report for trade contractor 13.

The warranty report lists the results of an appointment at the home of homeowner 11. In one embodiment, warranty report for homeowner 11 is formatted as an informational letter for homeowner 11 detailing what work requests are assigned for completion, what work requests are not assigned for completion, and why each work request is or is not assigned for completion. The scheduled work report lists the work assigned to a particular trade contractor 13 from the selected work order and the scheduled date of completion. The scheduled work report is formatted as a letter to trade contractor 13. Unscheduled work report is similar to scheduled work report described above. However, the unscheduled work report instructs trade contractor 13 to contact homeowner 11 to arrange a date of completion. The recently assigned work report is formatted as a letter written to inform trade contractor 13 that a new item has been assigned to trade contractor 13. Each of the current work reports can be sent by administrator via e-mail or fax directly through construction work management system 10 via network 22 or can be printed and faxed or mailed manually. Other reports based on work order information stored in database 14 will be apparent to those of ordinary skill in the art.

Scheduling Related Tasks

Figure 20:
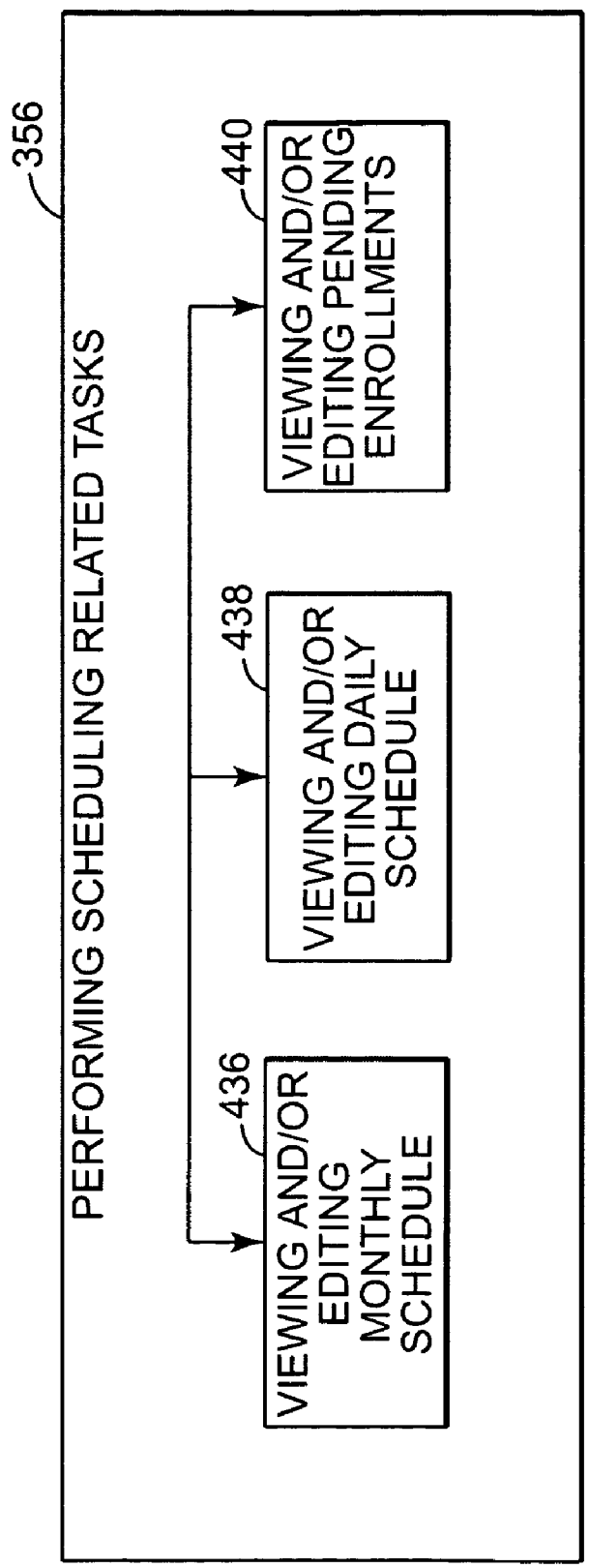
FIG. 20 is a flow chart illustrating an exemplary embodiment of a administrative method of completing scheduling related tasks in accordance with the flow chart of FIG. 15.

Collectively referencing FIGS. 15, 19, and 20, upon selection of scheduling tab 338, administrator 15 performs scheduling related tasks 356 including viewing and/or editing a monthly schedule 436, viewing and/or editing a daily schedule 438, and viewing and/or editing pending enrollments 440. Viewing monthly schedule 436 shows all scheduled appointments for selected personnel of administrator 15 in a monthly calendar format. In one embodiment, each entry lists the personnel of administrator 15 scheduled, the scheduled time, and a brief description of location of the home to which the appointment relates. In one embodiment, the information included in each entry is at least partially dictated by calendar space. In one embodiment, appointments are color coded to illustrate the type of appointment. In one embodiment, administrator 15 can view different months by selecting desired months from a drop-down box, by using scroll arrows, etc. In one embodiment, by selecting a day on the calendar, administrator 15 is redirected to viewing and/or editing the daily schedule.

At 438, the daily schedule is viewed. The daily schedule contains similar information as monthly schedule, but displays the information in a daily format. Due to the additional space provided in a daily format, more detailed information about a scheduled appointment is displayed in the daily schedule. Administrator 15 can view different daily schedules by selecting a new day from a drop-down box, by using scroll arrows, or by selecting another day from the monthly schedule. In one embodiment, the monthly schedule and the daily schedule are presented in or provide access to a printer-friendly version. In one embodiment, selection of any 15-minute time slot in the daily schedule will redirect administrator 15 to a dialog box where the scheduled appointment can be added and/or edited, schedule types can be added and/or edited, and other schedule related maintenance can be performed by administrator 15.

At 440, a list of new enrollments requiring an orientation to be scheduled is displayed to administrator 15. The list is automatically created upon creation of a new enrollment by builder 12 or administrator 15. In one embodiment, the list of new enrollments requiring an orientation includes comments pertinent to scheduling an orientation convenient to the corresponding homeowner of each new enrollment. In one embodiment, the list of new enrollments requiring an orientation includes a requested date of orientation provided by homeowner 11. In one embodiment, upon selecting the requested date, administrator 15 is automatically directed to the daily schedule for the requested date.

Builder Related Tasks

Figure 21:
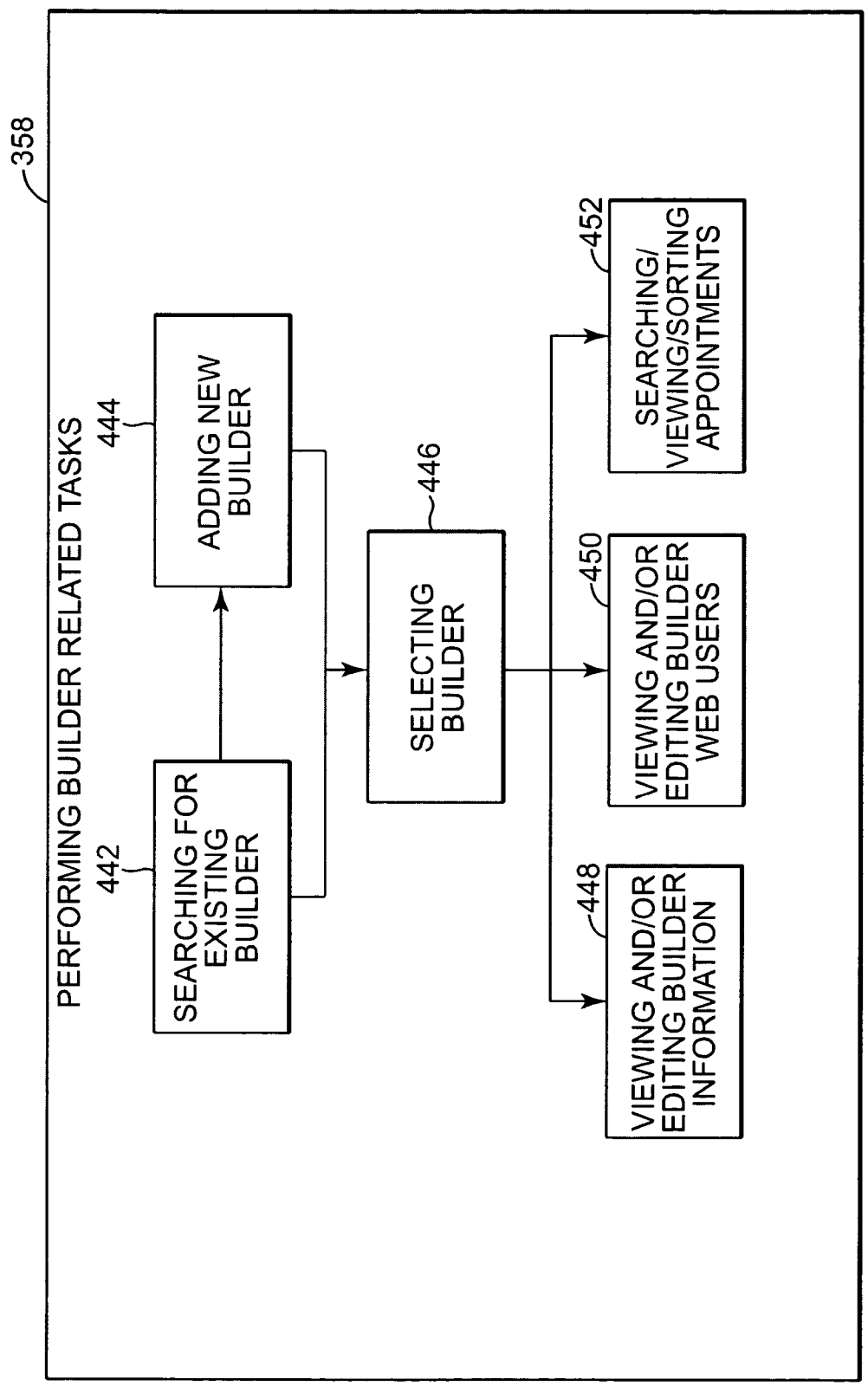
FIG. 21 is a flow chart illustrating an exemplary embodiment of a administrative method of completing builder related tasks in accordance with the flow chart of FIG. 15.

Collectively referencing FIGS. 15, 19, and 21, upon selection of builder tab 340, administrator 15 performs builder related tasks 358. At 442, administrator 15 searches for a particular builder 12 from the plurality of builders 12 stored in data storage 106 (illustrated in FIG. 8). Administrator 15 can search for the particular builder by way of a variety of search methods based on city, development, residence type, etc. If administrator 15 finds that the particular builder 12 is not yet stored in data storage 106, administrator 15 can add a new builder 12 to data storage 106 and, thereby, to construction work management system 10 at 444. Alternatively, administrator 15 can add a new builder 12 without first searching for an existing builder 12 at 442. If administrator 15 finds the particular builder 12 to already be stored in data storage 106, administrator 15 selects that builder 12. Similarly, upon adding the new builder 12 at 444, that builder 12 is selected at 446. In one embodiment, no builder data can be viewed until a builder 12 is selected at 446.

After a particular builder 12 is selected, administrator 15 chooses a course of action such as viewing and/or editing builder information 448; viewing and/or editing builder web users 450; and searching, viewing, and/or sorting appointments 452. At 448, basic information about the selected builder 12 and the primary contact personnel of builder 12 is displayed to administrator 15. In one embodiment, the primary contact personnel includes a primary contact for enrollment of new homes, a primary contact for assignment of work orders to trade contractors 13, and a primary contact for service department inquires.

Basic information further includes a user identification and a password for each of the primary contact personnel. The user identifications and passwords may be assigned automatically or manually. Basic information still further includes the designated access level for each primary contact. Administrator 15 can edit builder information in a similar manner as described with respect to homeowner information in step 392 above.

At 450, builder personnel 70, 72, or 74 not included as primary contacts, but with access to construction work management system 10 are displayed for viewing by administrator 15. Each of the residuary builder personnel (i.e., the personnel not included as primary contacts) is displayed with a user identification, a password, and a designated access level. In one embodiment, user identifications and passwords for the residuary builder personnel are automatically selected. At 450, administrator 15 can add, edit, and/or delete the displayed information.

At 452, administrator 15 views a display of the scheduled appointments for builder 12. In one embodiment, the schedule appointments are filtered or sorted before being displayed. In one embodiment, the scheduled appointments can be viewed as a list, in monthly calendar format, or in daily calendar format. From any of these views, administrator 15 can search for a particular appointment.

At 454, administrator 15 generates and/or views one or more of a plurality of available reports useful in analyzing builder issues. Following selection of a report from the menu and selection of any modification or additional menu items regarding the report are entered, a report is displayed corresponding with the selected menu items. In one embodiment, at 454, administrator 15 views reports including at least partial access to the data comparison reports. In one embodiment, the reports viewed at 454 include but are not limited to a list of associated trade contractors 13, a list of associated homeowners 11, a list of builder developments, a list of resident types constructed by builder 12, etc.

Trade Contractor Related Tasks

Figure 22:
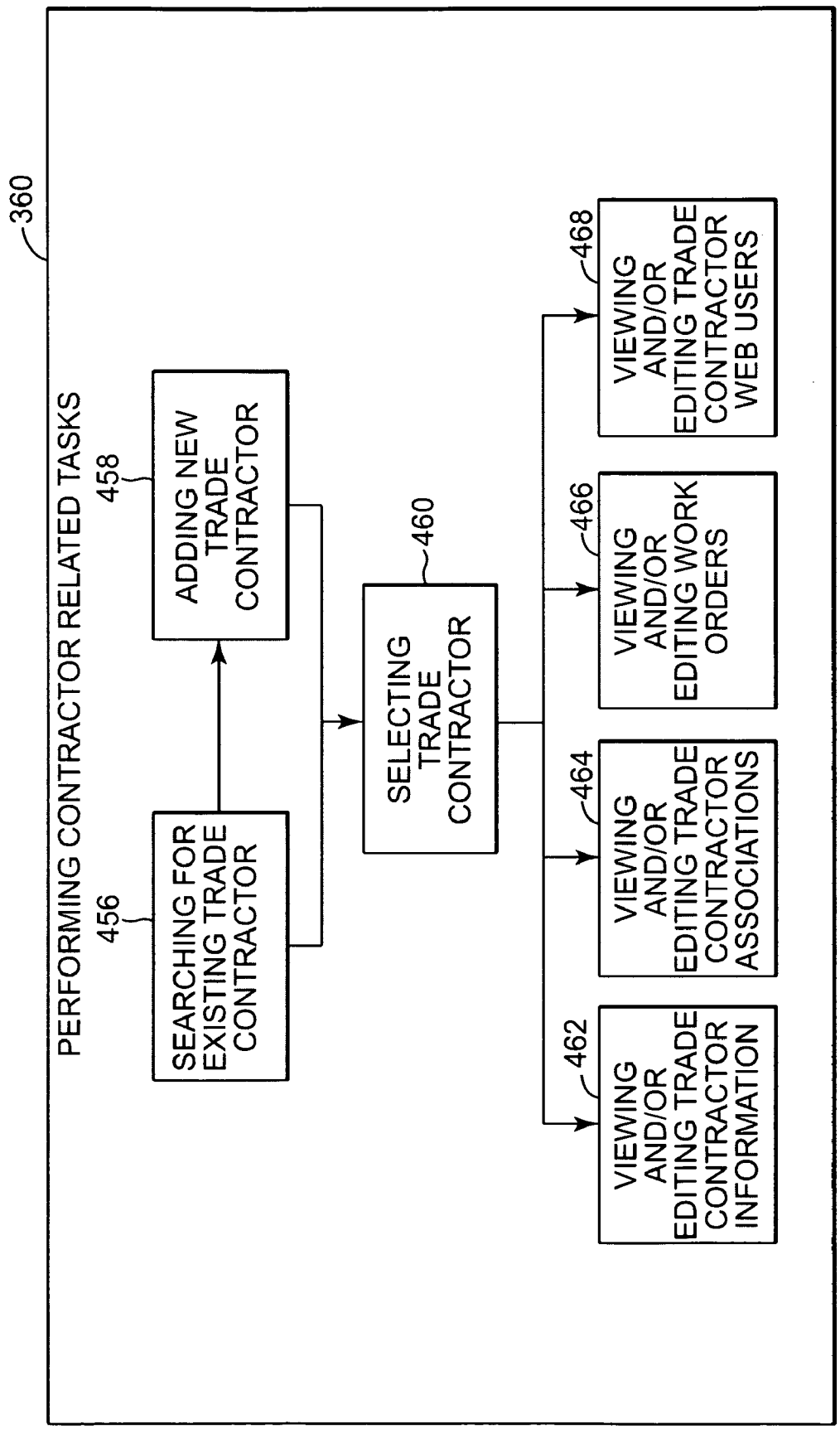
FIG. 22 is a flow chart illustrating an exemplary embodiment of a administrative method of completing trade contractor related tasks in accordance with the flow chart of FIG. 15.

Collectively referencing FIGS. 15, 19, and 22, upon selection of trade contractor tab 342, administrator 15 performs trade contractor related tasks 360. At 456, administrator 15 searches for a particular trade contractor 13 from the plurality of trade contractors 13 stored in data storage 106 (illustrated in FIG. 8). Administrator 15 can search for the particular trade contractor 13 by way of a variety of search methods based on contact name, address, phone number, etc. If administrator 15 finds that the particular trade contractor 13 is not yet stored in data storage 106, administrator 15 can add a new trade contractor 13 to construction work management system 10 at 458. Alternatively, administrator 15 can add a new trade contractor 13 without first searching for an existing trade contractor 13 at 456. If administrator 15 finds the particular trade contractor 13 to already be stored in data storage 106, administrator 15 selects that trade contractor 13 at 460. Similarly, upon adding the new trade contractor 13 at 458, the new trade contractor 13 is selected at 460. In one embodiment, no trade contractor data can be viewed until a trade contractor 13 is selected at 460.

After a particular trade contractor 13 is selected, administrator 15 chooses a course of action such as viewing and/or editing trade contractor information 462, viewing and/or editing trade contractor associations 464, viewing and/or editing work orders 466, and viewing and/or editing trade contractor web users 468. At 462, basic information about the selected trade contractor 13 and the primary contact personnel of trade contractor 13 is displayed to administrator 15. In one embodiment, the type of work that trade contractor 13 performs is noted in this step 462. In one embodiment, the trade contractor information includes whether or not trade contractor 13 is available for emergencies and, if so, the contingency plan for contacting trade contractor 13 after hours. In one embodiment, each of the trade contractors 13 in construction work management system 10 is assigned to a particular personnel member of administrator 15. When trade contractor 13 send e-mails to administrator 15 at 318 (illustrated in FIG. 13), the e-mails are automatically routed to the particular personnel member designated for the communicating trade contractor 13.

At 464, administrator 15 views and/or edits a list of builders 12 associated with the selected trade contractor 13. In one embodiment, two windows exist (not shown) on the display screen. The first window lists all builders 12 in construction work management system 10, and the second window lists builders 12 associated with the selected trade contractor 13. Administrator 15 then selects builders 12 from the first window to add to the second window list and/or selects builders 12 from the second window to be removed from the second window list to effectively edit the list of builders 12 associated with trade contractor 13.

At 466, administrator 15 views work orders assigned to selected trade contractor 13. If administrator 15 elects to edit work orders at 466 as well, administrator 15 performs steps similar to executing a selection of a work order at 420 (illustrated in FIG. 18), as described above, and views a screen similar to the multi-edit screen described above with respect to performing work order related tasks 354 (illustrated in FIG. 15).

At 468, administrator 15 views entries of trade contractor personnel 82 and 84 not included as primary contacts, but with access to construction work management system 10. Each of the residuary trade contractor personnel (i.e., the personnel 82 and 84 not included as primary contacts) is displayed with a user identification, a password, and a designated access level. In one embodiment, user identifications and passwords for the residuary trade contractor personnel are automatically selected. At 468, administrator 15 can add, edit, and/or delete the displayed information.

Reporting Tasks

Figure 23:
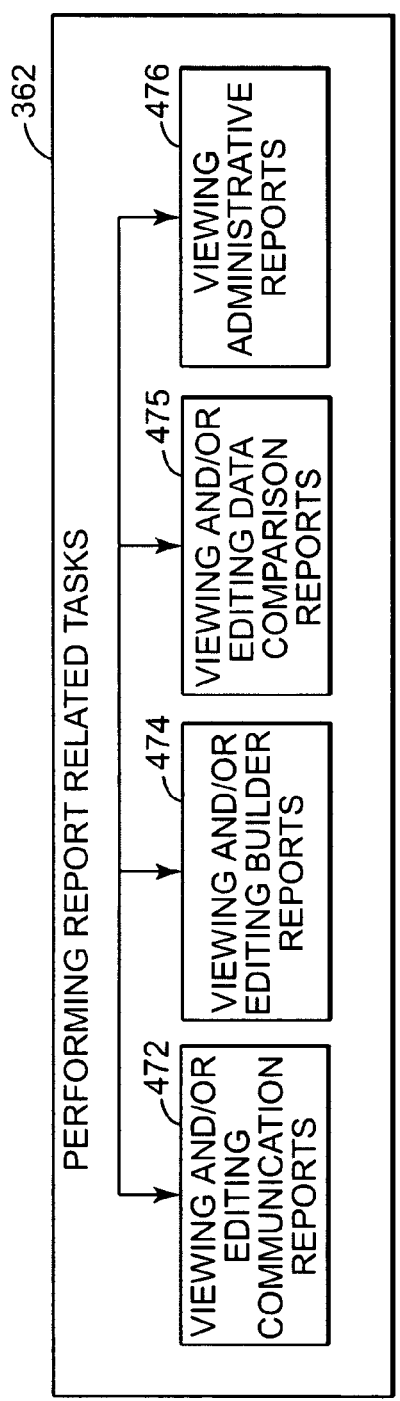
FIG. 23 is a flow chart illustrating an exemplary embodiment of a administrative method of completing report related tasks in accordance with the flow chart of FIG. 15.

Referencing FIGS. 15, 19, and 23, upon selection of reports tab 344, administrator performs report related tasks at 362. Report related tasks include viewing and/or editing communication reports 472, viewing and/or editing builder reports 474, viewing and/or editing data comparison reports 475, and viewing and/or editing administrative reports 476. At 472, administrator 15 views a display of the status of work orders received via alternate communication link 16 (illustrated in FIG. 2). In one embodiment, the type of communication, the source of the communication, and the status of the communication (i.e., completed or failed) is indicated for each communication sent out via network communication link 22. In one embodiment, the communication reports are sorted based upon criteria such as by completed communications, failed communications, or assigned trade contractor 13. At 472, administrator 15 can additionally edit the communication reports.

At 474, administrator 15 views builder report templates for the reports described above. More specifically, administrator 15 views the templates that define what data is included and how the data is arranged for a particular report. In one embodiment, the templates can be edited at 474 for specific needs. In one embodiment, at 474, administrator 15 can create new templates for additional reports not described above.

At 475, administrator views reports based on data comparison reports. Pursuant to the level of permission for the particular personnel of administrator 15, data comparison reports can be viewed and sorted by date, builder, contractor, homeowner, and any other sorting options that are relevant to the report and available for selection. In one embodiment, the data comparison reports can be edited at 475 for specific needs.

At 476, administrator 15 views administrative reports. In one embodiment, administrative reports include lists of construction work management system 10 usage, individuals and parties using construction work management system 10, traffic levels of data transfer via network 22 (illustrated in FIG. 2). In one embodiment, the information contained in the administrative reports can be filtered or sorted at 476 for simplified viewing and analyzing by administrator 15.

Accounting Tasks

Figure 24:
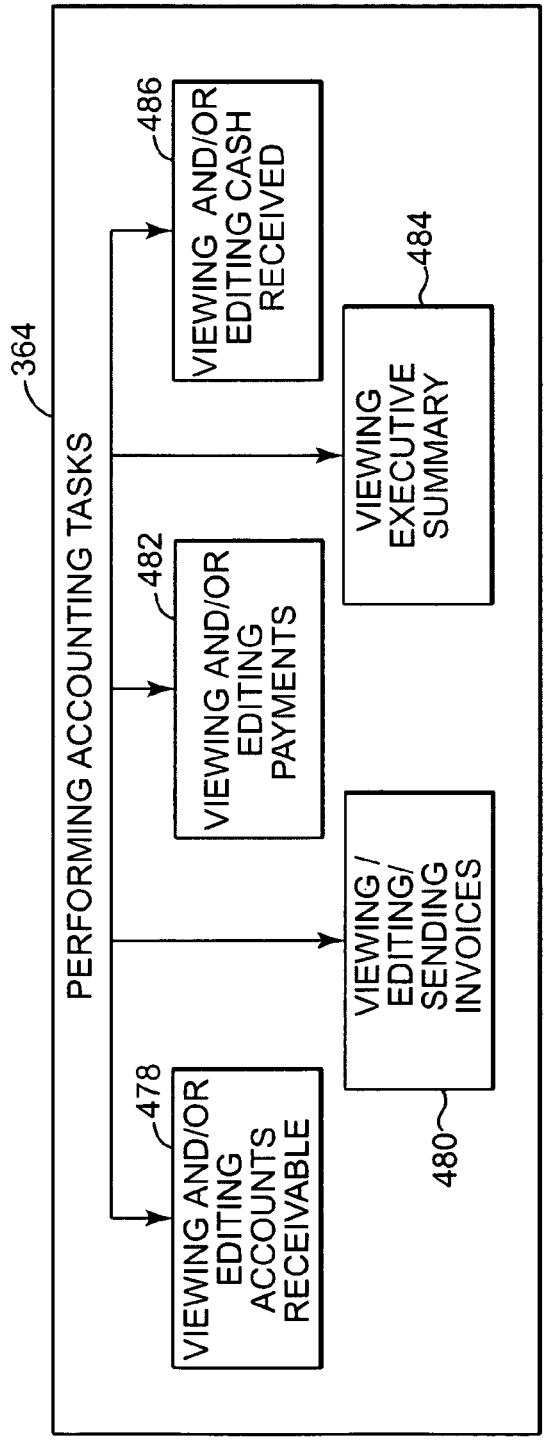
FIG. 24 is a flow chart illustrating an exemplary embodiment of a administrative method of completing accounting tasks in accordance with the flow chart of FIG. 15.

Collectively referring to FIGS. 15, 19, and 24, upon selection of accounting tab 346, administrator 15 performs accounting tasks at 362. For example, at 478, administrator 15 views and/or edits accounts receivable for administrator 15. At 480, administrator 15 views, edits, and or sends invoices for services rendered or services to be rendered to parties 11, 12, and 13. Steps 478 and 480 are common accounting tasks and, therefore, the details of steps 478 and 480 are apparent to those of skill in the art. Other accounting functions can be customized to the needs of the individual site. In one embodiment, invoices are generated based on payment per usage (i.e., per home, per work referral, per user, etc.) and/or based upon party subscriptions.

At 482, administrator 15 views and/or edits payment information stored in database 14. In one embodiment, all outstanding and received payment information is included in payment information. In one embodiment, payment information can be filtered or sorted to simplify the view of the payment information for administrator 15. Also at 482, administrator 15 can update and/or edit the payment information stored in database 14.

At 484, administrator 15 accesses and views an executive summary 484. The executive summary provides a brief overview of the administrator's financial information. In one embodiment, the content of the executive summary is determined or at least partially dependent upon options selected by administrator 15. In one embodiment, administrator 15 selects the date range and at least some of the content of the executive summary through option selection. At 486, administrator views and/or edits records regarding cash payment received as will be apparent to those of ordinary skill in the art. Additional accounting tasks may be included in step 362 as will be apparent to those of ordinary skill in the art.

Administrative Tasks

Figure 25:
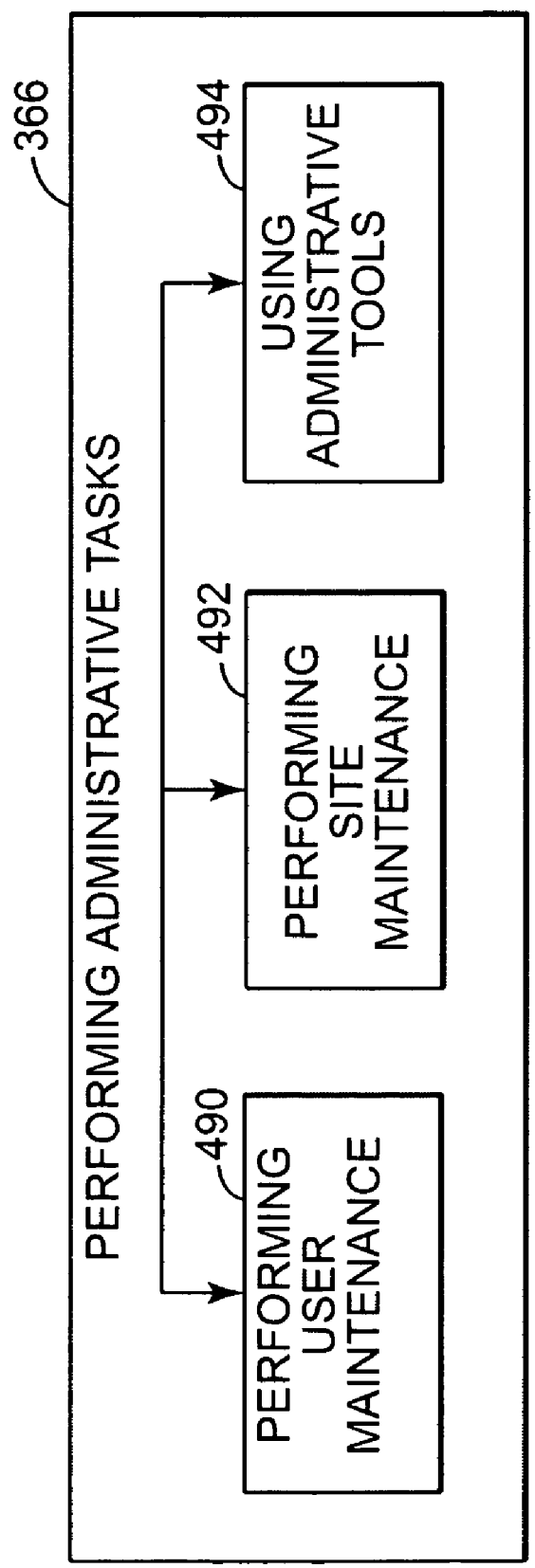
FIG. 25 is a flow chart illustrating an exemplary embodiment of a administrative method of completing administrative tasks in accordance with the flow chart of FIG. 15.

Collectively referring to FIGS. 15, 19, and 25, upon selection of administrative tab 348, administrator 15 performs administrative tasks 366. In one embodiment, performing administrative tasks 366 includes performing user maintenance 490, performing site maintenance 492, and using administrative tools 494. At 490, administrator 15 performs user maintenance that, in one embodiment, includes maintaining current user lists, maintaining user information, monitoring user logs, etc. At 492, administrator 15 performs site maintenance including, adding or editing existing sites, customizing the appearance of the web user interface, etc. At 494, administrator 15 uses the web tools such as a letter generator, internal message manager, and a warranty editor.

The letter generator facilitates creating and sending mass mailings to selected groups of parties 11, 12, and 13. The letters can be e-mailed directly within construction work management system 10 via network 22 or can be printed and mailed or faxed manually. Each letter can be named and archived for future use.

Internal message manager is used for the receipt and/or response to messages that are sent through the communication links in the web user access. Any communication sent through administrator 15 via menu options/tabs 202, 264, or 318; or any communication via a contact link built into individual work order items through the reports visible to web users; or any other administrator-initiated communication received through the construction work management system 10 reside in this menu. Responses can be made to other administrators 15 through the construction work management system 10, and go out through a non-system e-mail service to non-administrators. In all cases, mail sent from or received through construction work management system 10 is documented, and a storable and retrievable copy is saved to the homeowner history.

The warranty editor is used to add or edit warranty items stored in warranty information subsection 112 of data storage 106 (illustrated in FIG. 8). In one embodiment, warranty editor gives administrator the ability to designate entries to be shown to the public or kept private. As such, entries designated to show to the public will appear when parties 11, 12, and 13 view the builder's limited warranty. Items or comments designated private are not present in the builder's limited warranty as displayed to parties 11, 12, and 13.

Overall Functioning

Figure 26:
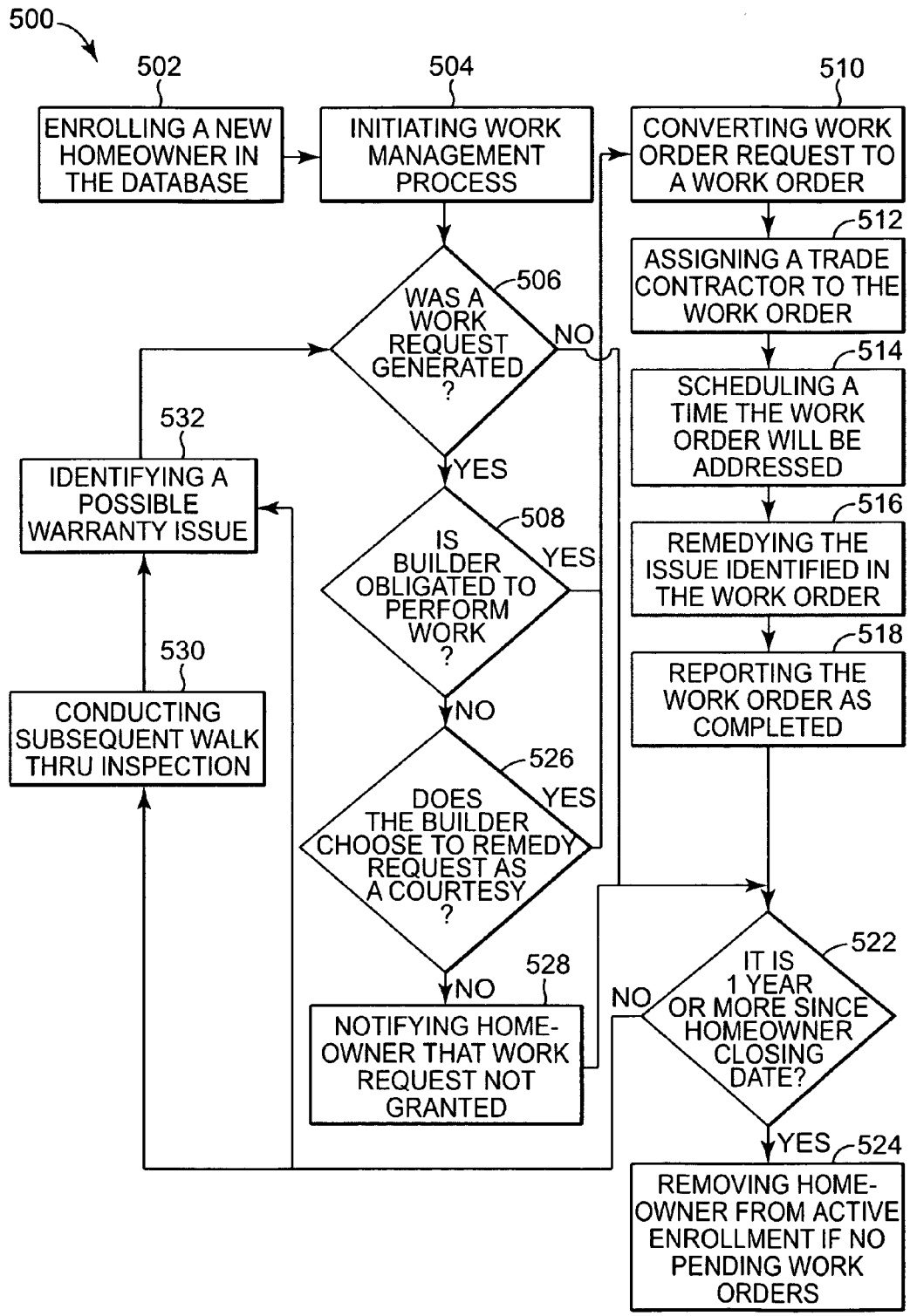
FIG. 26 is a flow chart illustrating an exemplary embodiment of method of construction work management in accordance with the construction work management system of FIG. 2.

With the above description of construction work management system 10 in mind, the overall functioning of construction work management system 10 is to facilitate overall communication and benefit relationships between homeowner 11, builder 12, and trade contractors 13 before and during the statutory limited warranty period or some longer period as dictated by builder 12. In one embodiment, part of the overall communication between parties 11, 12, and 13 includes management of work orders. One partial embodiment of a method of construction work management 500 using construction work management system 10 for managing work orders is generally illustrated in FIG. 26. The method of performing each step within method 500 will be apparent in the description above and, therefore, will only generally be described here.

At 502, a new homeowner 11 is enrolled in construction work management system 10 either manually or by an automated computer driven process by builder 12 or administrator 15. At 504, homeowner 11 and/or builder 12 initiate the process by contacting administrator 15 with a possible work request or area of concern regarding the construction of the home.

Following initiation of the process at 502, at 506 homeowner 11 through administrator 15 or builder 12 may file or generate a work order request. Notably, the work order request may be either a pre-closing work order request or a warranty work order request. If the request was received after possession of the home by homeowner 11, at 508 builder 12 evaluates whether the request qualifies for repairs under the terms of the builder's limited warranty or if builder 12 is otherwise obligated to perform the requested work. If the result at 508 is that the request is covered under the builder's limited warranty, it is converted into a warranty work order at 510.

If a work request generated at 506 was the result of a pre-closing inspection, the builder's limited warranty is not necessarily relevant. Whether or not to remedy a pre-closing work request is left to the sole discretion of builder 12 with respect to any previous agreements or expectations of homeowner 11. With this in mind, at 508, builder 12 determines if builder 12 is obligated to perform the work in view of any previous agreement or expectations of homeowner 11. If a request is approved (i.e., the builder is obligated to perform the work), then at 510 the work request becomes a pre-closing work order.

At 512, the new work order is assigned to a trade contractor 13 for action and remedy. In one embodiment, builder 12 assigns trade contractor 13 from a list of trade contractors 13 associated with builder 12. Notably, trade contractor 13 is selected based upon the particular skill set of trade contractor 13 and the nature of the work order. In one embodiment, in which a work order contains multiple items, each item of the work order can be assigned to different or the same trade contractor(s) 13. At 514, an appointment may be scheduled to remedy the work order. In one embodiment, builder 12 schedules an appointment as soon as trade contractor 13 is assigned to the work order. In an alternative embodiment, trade contractor 13 schedules the appointment upon being assigned to the work order. If a work order is not scheduled, the appointment may be set in whatever manner is customary to builder 12 and the related construction network.

Trade contractor 13 remedies or at least attempts to remedy the work order item at 516. Preferably, trade contractor 13 remedies the work order item 516 on the day the appointment was scheduled with homeowner 11 to address the work order. At 518, trade contractor 13 reports the work order as being complete upon performing the remedy work and believing the issue to be remedied. At 520, completion of the work order as reported by trade contractor 13 in 518 may be verified by a non-contractor party, such as by homeowner 11, builder 12, and/or administrator 15. If the work order is not verified, the work order may be reassigned at 512, or the originally assigned trade contractor 13 must make a return call or visit to homeowner 11, or the work order item may be reassigned to a different trade contractor 13 to address the remaining issue(s).

Following work order completion and verification, an inquiry is made as to whether the statutory limited warranty period has expired for homeowner 11 at 522. In one embodiment, the statutory limited warranty period has expired if it is more than 1 year from the closing date of homeowner 11. In one embodiment, the statutory limited warranty period has expired if it has been more than 2 years from the closing date of homeowner 11. In another embodiment, the inquiry at 522 is made as to whether the warranty period as extended beyond the statutory limited warranty period by builder 12 has expired. If it is determined that the statutory limited warranty period has expired and no pending work orders remain with respect to homeowner 11, homeowner 11 is removed from active status in data storage 106 of construction work management system 10 and categorized as an archived homeowner. Homeowner 11 is archived automatically by the system, and may be retrieved manually if it becomes necessary for up to twelve years and six months.

Conversely, if the inquiry 506 determines that no work request was generated, inquiry 522 is immediately asked to determine if the builder's limited warranty for homeowner 11 has expired. Once again, if the builder's limited warranty has expired and no pending work orders remain for homeowner 11, homeowner 11 is removed from construction work management system 10 to the archives at 524.

Alternatively, if it is found at inquiry 508 that a work request generated after homeowner possession of the home does not fall within the builder's limited warranty, a secondary inquiry is made at 526 as to whether builder 12 chooses to remedy the work request as a courtesy to homeowner 11. Whether or not to remedy a non-warranty work request is left to the sole discretion of builder 12. If builder 12 chooses to remedy the work request as a courtesy in 526, the work request is converted to a warranty work order in 510 and processed accordingly as described above.

If builder 12 chooses not to remedy the work request as a courtesy in 526, homeowner 11 is notified that the work request will not be granted and given a reason why at 528. Following homeowner 11 notification at 528, inquiry 522 is applied to determine whether the builder's limited warranty has expired with respect to homeowner 11. Once again, if it is determined that it has been more than one year since homeowner 11 took possession of the home, homeowner 11 is removed from active status in construction work management system 10 and added to the archives at 524.

If the builder's limited warranty has not expired with respect to homeowner 11, subsequent walk-throughs and orientations are conducted at 530. During the subsequent walk-throughs and orientations or as identified by homeowner 11 not as the result as a walk-through or orientation, possible warranty issues may be identified at 532. In the event that one or more possible warranty issues are identified in 532, a work request may be generated. Such warranty issues are evaluated to determine if a work order request was generated at 506 and processed as described above following determination of inquiry 506. The method of warranty management is repeated for a plurality of homeowners 11. Other variations of the method of construction work management will be apparent to those of ordinary skill in the art.

Alternative Embodiments

Figure 27:
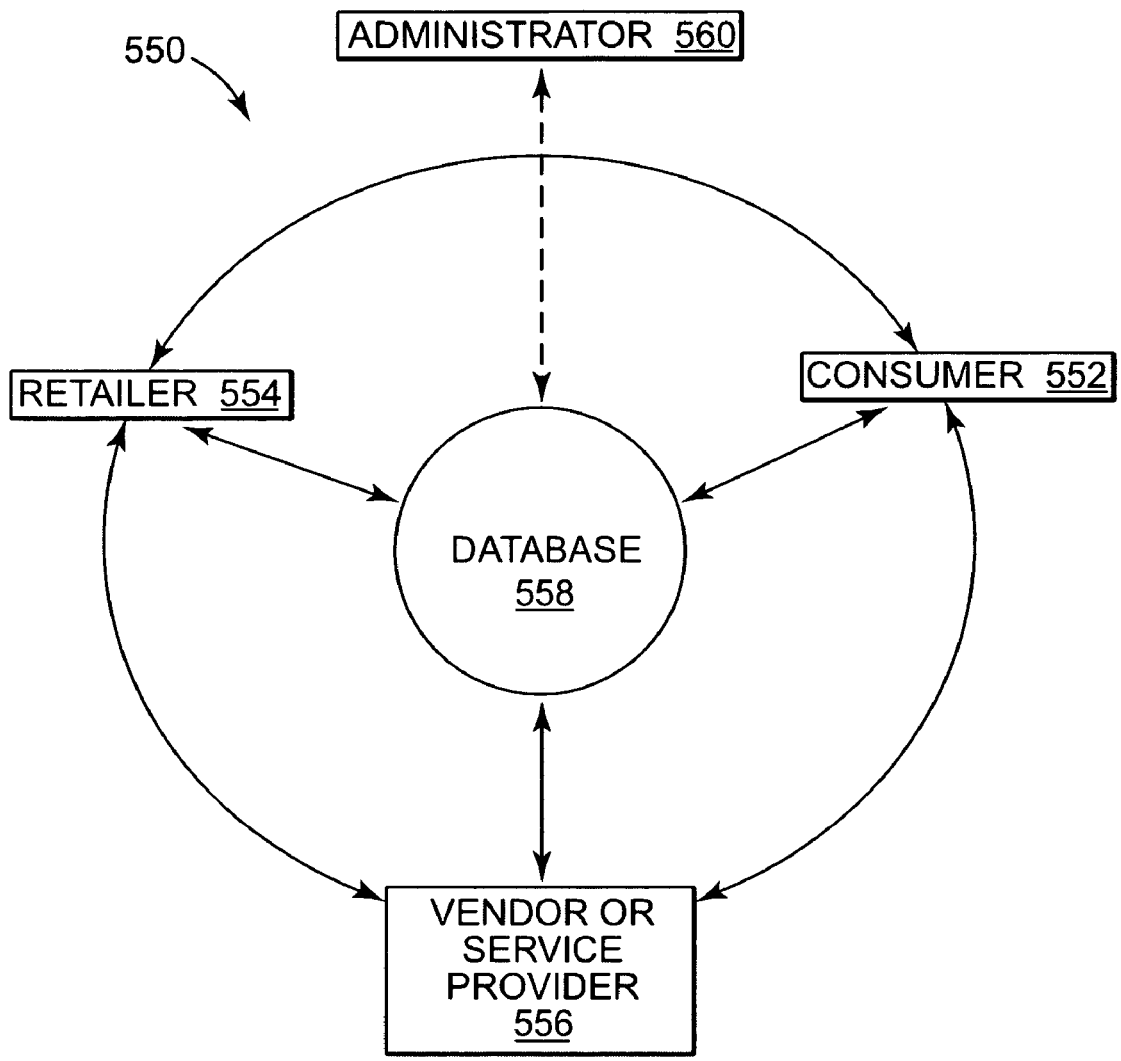
FIG. 27 is a block diagram generally illustrating an exemplary embodiment of a work management system.

FIG. 27 illustrates a general warranty management system generally at 550. Warranty management system 550 is similar to construction work management system 10 except for those differences specifically enumerated herein. Warranty management system 550 applies to any general product sold with an attached warranty of some sort (i.e., limited warranty, express warranty, implied warranty, etc.). Rather than homeowner 11, builder 12, and trade contractor 13, warranty management system 550 includes a consumer 552, a retailer 554, and a vendor or service provider 556, respectively. Consumer 552, retailer 554, and vendor 556 perform similar functions as described with respect to the counterparts of construction work management system 10 but with respect to the product sold rather than the new home. Similarly, warranty management system 550 further includes database 556 and administrator 558, which are similar to database 14 and administrator 15 described above except for the product that warranty management system 550 is centered around and other incidental differences as will be apparent to those of skill in the art.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of warranty process management for construction work, the method comprising:

providing a warranty process management system for construction work comprising a database storing warranty standards for at least one building owned by an owner, the database in selective communication with an owner computer interface, a builder computer interface, a trade contractor computer interface, and an administrator computer interface each of the owner computer interface, the builder computer interface, the trade contractor computer interface, and the administrator computer interface providing a different graphical user interface for accessing the database, the warranty standards comprising warranty standards for products used in constructing the at least one building and warranty standards for services used for constructing the at least one building;

creating, via one of the interfaces, a work request regarding a building in the database, the work request including an identifier indicating whether the work request is a warranty work request related to the warranty standards or a pre-closing work request;

assigning, via the builder interface, the work request created in the database to a trade contractor to complete the work request;

tracking, via at least one of the interfaces, the status of the work request in the database; and storing, via at least one of the interfaces, the work request, the trade contractor, and the status in the database for subsequent access via at least one of the owner interface, the builder interface, the trade contractor interface, and the administrator interface.

2. The method of claim 1, further comprising:

logging, via at least one of the interfaces, records of communications between the owner interface and the builder interface in the database.

3. The method of claim 1, further comprising:

scheduling, via the builder interface, a time for the trade contractor to complete the work request; and recording, via the builder interface, the scheduled time in the database.

4. The method of claim 1, wherein scheduling a time for the trade contractor to complete the work request includes viewing a trade contractor schedule of previously scheduled work stored in the database.

5. The method of claim 1, wherein the assigned trade contractor is associated with the trade contractor computer interface coupled to the database via a network communication link, and the work request, assignment, and status stored in the database are accessible by the trade contractor via the trade contractor interface and the network communication link.

6. The method of claim 1, further comprising:

determining if the work request falls within a builder's limited warranty.

7. The method of claim 6, wherein assigning the work request only occurs if the work request does fall within the builder's limited warranty.

8. The method of claim 1, further comprising:

viewing, via at least one of the interfaces, reports related to the status of the work request for at least one of a builder and the trade contractor.

9. The method of claim 8, further comprising:

sorting, via at least one of the interfaces, the reports based upon parameters chosen by one of the builder and the trade contractor.

10. The method of claim 1, further comprising:

conducting a building orientation and the work request is generated as a result of an issue identified during the building orientation.

11. The method of claim 1, further comprising:

denying access to the database by an owner via the owner interface after a warranty period has elapsed since the owner closed on the building.

12. The method of claim 1, further comprising:

assigning an owner selectively utilizing the owner interface and a builder selectively utilizing the builder interface on each one of a plurality of access levels, each access level defining at least one area of permitted access in the database.

13. A method of warranty process management for construction work, the method comprising:

providing a warranty process management system for construction work comprising a database storing warranty standards for at least one building owned by an owner, the database in selective communication with an owner computer interface, a trade contractor computer interface, a builder computer interface, and an administrator computer interface, each of the owner computer interface, the builder computer interface, the trade contractor computer interface, and the administrator computer interface providing a different graphical user interface for accessing the database, the warranty standards comprising warranty standards for products used in constructing the at least one building and warranty standards for services used for constructing the at least one building;

creating, via one of the interfaces, a work request regarding a building in the database, the work request including an identifier indicating whether the work request is a warranty work request related to the warranty standards or a pre-closing work request;

assigning, via the builder interface, the work request created in the database to a trade contractor to complete the work request;

tracking, via at least one of the interfaces, the status of the work request in the database;

reporting, via at least one of the interfaces, the work request as complete to the database; and storing, via at least one of the interfaces, the work request, the trade contractor, the status, and the report of completion in the database for subsequent access via at least one of the owner interface, the trade contractor interface, the builder interface, and the administrator interface.

14. The method of claim 13, wherein tracking the status of the work request includes tracking the time between assigning the work request and reporting the work request as complete.

15. The method of claim 13, further comprising:

generating, via at least one of the interfaces, empirical data based at least in part upon the tracked status of the work request.

16. The method of claim 15, wherein generating empirical data is completed for each of a plurality of builders, the method further comprising:

comparing, via the administrator computer interface, the empirical data of the plurality of builders.

17. The method of claim 15, wherein tracking the status of the work request is repeated for a plurality of work requests, and generating empirical data includes generating a Builder Efficiency Rating equal to a number of assigned work orders not reported complete divided by a number of buildings a builder has falling within a warranty period.

18. The method of claim 15, wherein tracking the status of the work request is repeated for a plurality of work requests, and generating empirical data includes generating a Builder Warranty Average equal to an average number of days required for completion of and report of completion of the work requests assigned to the trade contractor for the builder.

19. The method of claim 15, further comprising:

approving, via the builder interface, a work request to be assigned to the trade contractor;

wherein tracking the status of the work request is repeated for a plurality of work requests, and generating empirical data includes generating a Pre-Closing Management Ratio equal to an average number of unverified, unapproved work requests created during an orientation of the building divided by an average number of work requests that are approved and assigned to the trade contractor as a result of pre-closing inspections of the building.

20. The method of claim 15, wherein tracking the status of the work request is repeated for a plurality of work requests, and generating empirical data includes generating a Pre-Closing Completion Average equal to an average number of work requests assigned to the trade contractor and completed before a closing date of the building divided by the average number of work requests assigned to the trade contractor prior to the closing date of the building.

21. The method of claim 15, wherein tracking the status of the work request is repeated for a plurality of work requests, and generating empirical data includes generating a Trade Contractor Productivity Ratio equal to an expected completion time for the work request divided by an average time of completion for similar work requests assigned to a trade contractor.

22. The method of claim 15, wherein tracking the status of the work request is repeated for a plurality of work requests, and generating empirical data includes generating a Trade Contractor Completion Average equal to an average number of days required for the trade contractor to complete the work requests assigned to the trade contractor and reported complete.

23. A warranty process management system comprising:
a database storing a builder's limited warranty for products and services used for constructing a building, work order information relating to the builder's limited warranty, the work order information including a work request including an identifier indicating whether the work request is a warranty work request related to the builder's limited warranty or a pre-closing work request, a trade contractor assigned to the work request, and the status of the work request; and
a network communication link coupled with the database;
wherein the database is configured to selectively interface with an owner via an owner interface, a trade contractor via a trade contactor interface, a builder via a builder interface, and an administrator via an administrator interface via the network communication link, each of the owner interface, the builder interface, the trade contractor interface, and the administrator interface providing a different graphical user interface for accessing the database.

24. The warranty process management system of claim 23, wherein the database includes at least one index formula for creating empirical data regarding the efficiency of the trade contractor.

25. The warranty process management system of claim 23, wherein the database stores at least one index formula for creating empirical data regarding the efficiency of the builder.

26. The warranty process management system of claim 23, wherein the administrator interface is configured to facilitate an administrator in accessing the database via the network communication link, the administrator configured to perform at least one of maintaining the database, performing accounting tasks, and performing administrative tasks.

27. The warranty process management system of claim 23, wherein the database additionally stores profile information for each of the owner and the builder.

28. The warranty process management system of claim 23, wherein the database defines at least one of a plurality of access levels assigned to each of the owner and the builder.

29. The warranty process management system of claim 28, wherein each of the plurality of access levels defines at least one area of the database that is accessible to the owner or the builder assigned to the respective access level.

30. The warranty process management system of claim 23, wherein the database includes a log of all communications between the owner and the builder communicated via the network communication link.

31. A computer readable medium having computer-executable instructions for performing a method of warranty process management comprising:
creating a work request including an identifier indicating whether the work request is a warranty work request related, to warranty standards or a pre-closing work request, the warranty work request regarding a building in a database storing the warranty standards specific to the warranty work request, the database coupled to an owner and a builder, the warranty standards comprising warranty standards for products used in constructing the building and warranty standards for services used for constructing the building;
assigning the work request created in the database to a trade contractor to complete the work request; and
tracking the status of the work request in the database.

32. The computer readable medium having computer-executable instructions for performing a method of claim 31, the method further comprising:
automatically logging communications between at least two of the owner, the builder, and the trade contractor to the database.

33. The computer readable medium having computer-executable instructions for performing a method of claim 31, the method further comprising:
calculating empirical data regarding the work request based upon index formulas.

34. A method of warranty process management for construction work, the method comprising:
providing a warranty process management system for construction work comprising a database storing a builder's limited warranty for at least one building owned by an owner, the database in selective communication with an owner computer interface, a trade contractor computer interface, a builder computer interface, and an administrator computer interface, each of the owner computer interface, the builder computer interface, the trade contractor computer interface, and the administrator computer interface providing a different graphical user interface for accessing the database, the builder's limited warranty comprising warranty standards for products used in constructing the at least one building and warranty standards for services used for constructing the at least one building;
creating, via at least one of the interfaces, a work request regarding a building in the database, the work request including an identifier indicating whether the work request is a warranty work request related to the builder's limited warranty or a pre-closing work request;
determining if the work request falls within the builder's limited warranty;
determining whether to complete the work request if the work request is determined to not fall within the builder's limited warranty;
assigning, via the builder interface, the work request created in the database to a trade contractor to complete the work request if it is determined that the work request will be completed, including scheduling a time for the trade contractor to complete the work request; and
in response to determining that the work request will be completed:
tracking, via at least one of the interfaces, the status of the work request in the database;

reporting, via at least one of the interfaces, the work request as complete to the database;

storing, via at least one of the interfaces, the work request, the trade contractor, the scheduled time, the status, and the report of completion in the database for subsequent access via at least one of the owner interface, the builder interface, the trade contractor interface, and the administrator interface;

logging, via at least one of the interfaces, records of communications between at least two of the owner interface, the builder interface, the trade contractor interface, and the administrator interface in the database; and generating, via at least one of the interfaces, empirical data based at least in part upon the tracked status of the work request.

35. The method of claim 1, further comprising:

logging, via at least one of the interfaces, records of communications between the owner interface and the builder interface in the database;

scheduling, via the builder interface, a time for the trade contractor to complete the work request;

recording, via the builder interface, the scheduled time in the database;

viewing, via at least one of the interfaces, reports related to the status of the work request for at least one of a builder and the trade contractor;

sorting, via at least one of the interfaces, the reports based upon parameters chosen by one of the builder and the trade contractor;

conducting a building orientation and the work request is generated as a result of an issue identified during the building orientation; and denying access to the database by an owner via the owner interface after a warranty period has elapsed since the owner closed on the building;

wherein scheduling a time for the trade contractor to complete the work request includes viewing a trade contractor schedule of previously scheduled work stored in the database; and wherein the assigned trade contractor is associated with the trade contractor computer interface coupled to the database via a network communication link, and the work request, assignment, and status stored in the database are accessible by the trade contractor via the trade contractor interface and the network communication link.

36. The warranty process management system of claim 23, wherein the database includes at least one index formula for creating empirical data regarding the efficiency of the trade contractor;

wherein the database stores at least one index formula for creating empirical data regarding the efficiency of the builder;

wherein the administrative interface is configured to facilitate an administrator in accessing the database via the network communication link, the administrator configured to perform at least one of maintaining the database, performing accounting tasks, and performing administrative tasks;

wherein the database additionally stores profile information for each of the owner and the builder;

wherein the database defines at least one of a plurality of access levels assigned to each of the owner and the builder;

wherein each of the plurality of access levels defines at least one area of the database that is accessible to the owner or the builder assigned to the respective access level; and wherein the database includes a log of all communications between the owner and the builder communicated via the network communication link.

37. The computer readable medium having computer-executable instructions for performing the method of claim 31, the method further comprising:

automatically logging communications between at least two of the owner, the builder, and the trade contractor to the database; and calculating empirical data regarding the work request based upon index formulas.

* * * * *